US010761849B2

(12) United States Patent
Chou et al.

(10) Patent No.: US 10,761,849 B2
(45) Date of Patent: Sep. 1, 2020

(54) PROCESSORS, METHODS, SYSTEMS, AND INSTRUCTION CONVERSION MODULES FOR INSTRUCTIONS WITH COMPACT INSTRUCTION ENCODINGS DUE TO USE OF CONTEXT OF A PRIOR INSTRUCTION

(71) Applicant: Intel Corporation, Santa Clara, CA (US)

(72) Inventors: Ching-Tsun Chou, Palo Alto, CA (US); Oleg Margulis, Los Gatos, CA (US); Tyler N. Sondag, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/273,163

(22) Filed: Sep. 22, 2016

(65) Prior Publication Data
US 2018/0081684 A1    Mar. 22, 2018

(51) Int. Cl.
*G06F 9/30* (2018.01)
(52) U.S. Cl.
CPC ...... *G06F 9/30145* (2013.01); *G06F 9/30163* (2013.01); *G06F 9/30181* (2013.01)
(58) Field of Classification Search
None
See application file for complete search history.

(56) References Cited

U.S. PATENT DOCUMENTS

| 5,303,358 | A | * | 4/1994 | Baum | G06F 9/3001 712/226 |
| 6,014,735 | A | * | 1/2000 | Chennupaty | G06F 9/30149 712/210 |
| 6,167,505 | A | * | 12/2000 | Kubota | G06F 9/30149 712/210 |
| 6,308,258 | B1 | * | 10/2001 | Kubota | G06F 9/30149 712/210 |
| 6,418,527 | B1 | * | 7/2002 | Rozenshein | G06F 9/30018 712/204 |
| 8,281,109 | B2 | | 10/2012 | Valentine et al. | |

(Continued)

FOREIGN PATENT DOCUMENTS

JP    2011-134304 A    7/2011

OTHER PUBLICATIONS

International Search Report and Written Opinion received for PCT Patent Application No. PCT/US2017/049452, dated Dec. 11, 2017, 15 pages.

(Continued)

*Primary Examiner* — George Giroux
(74) *Attorney, Agent, or Firm* — NDWE, LLP

(57) ABSTRACT

A processor of an aspect includes a decode unit to decode a prior instruction that is to have at least a first context, and a subsequent instruction. The subsequent instruction is to be after the prior instruction in original program order. The decode unit is to use the first context of the prior instruction to determine a second context for the subsequent instruction. The processor also includes an execution unit coupled with the decode unit. The execution unit is to perform the subsequent instruction based at least in part on the second context. Other processors, methods, systems, and machine-readable medium are also disclosed.

25 Claims, 17 Drawing Sheets

(56) References Cited

U.S. PATENT DOCUMENTS

| | | | |
|---|---|---|---|
| 2004/0039897 A1* | 2/2004 | Kudo | G06F 9/3016 |
| | | | 712/213 |
| 2009/0172367 A1 | 7/2009 | Yoshida et al. | |
| 2013/0013894 A1* | 1/2013 | Arakawa | G06F 9/3001 |
| | | | 712/200 |
| 2013/0086362 A1 | 4/2013 | Gschwind et al. | |
| 2013/0111186 A1 | 5/2013 | Hickey et al. | |
| 2013/0159676 A1 | 6/2013 | Muff et al. | |
| 2013/0275723 A1* | 10/2013 | Combs | G06F 9/30094 |
| | | | 712/208 |
| 2013/0283249 A1 | 10/2013 | Kanhere et al. | |
| 2013/0305020 A1 | 11/2013 | Valentine et al. | |
| 2014/0108771 A1 | 4/2014 | Gschwind et al. | |
| 2014/0164741 A1* | 6/2014 | Gschwind | G06F 9/30029 |
| | | | 712/205 |
| 2015/0006851 A1* | 1/2015 | Dixon | G06F 9/3891 |
| | | | 712/205 |
| 2015/0378732 A1* | 12/2015 | Gschwind | G06F 9/466 |
| | | | 712/226 |
| 2017/0090932 A1* | 3/2017 | Frazier | G06F 9/342 |
| 2017/0091064 A1* | 3/2017 | Gschwind | G06F 11/362 |

OTHER PUBLICATIONS

Kanev, et al., "Profiling a Warehouse-Scale Computer", ACM, Jun. 2015, 12 pages.

Intel, "Intel 64 and IA-32 Architectures Software Developer's Manual", vol. 2 (2A, 2B & 2C): Instruction Set Reference, A-Z, Order No. 325383-040US, Oct. 2011, 1721 pages.

International Preliminary Report on Patentability for Application No. PCT/US2017/049452 dated Apr. 4, 2019, 14 pages.

European Supplementary Search Report and Search Opinion, EP App. No. 17853652, Apr. 20, 2020, 12 pages.

* cited by examiner

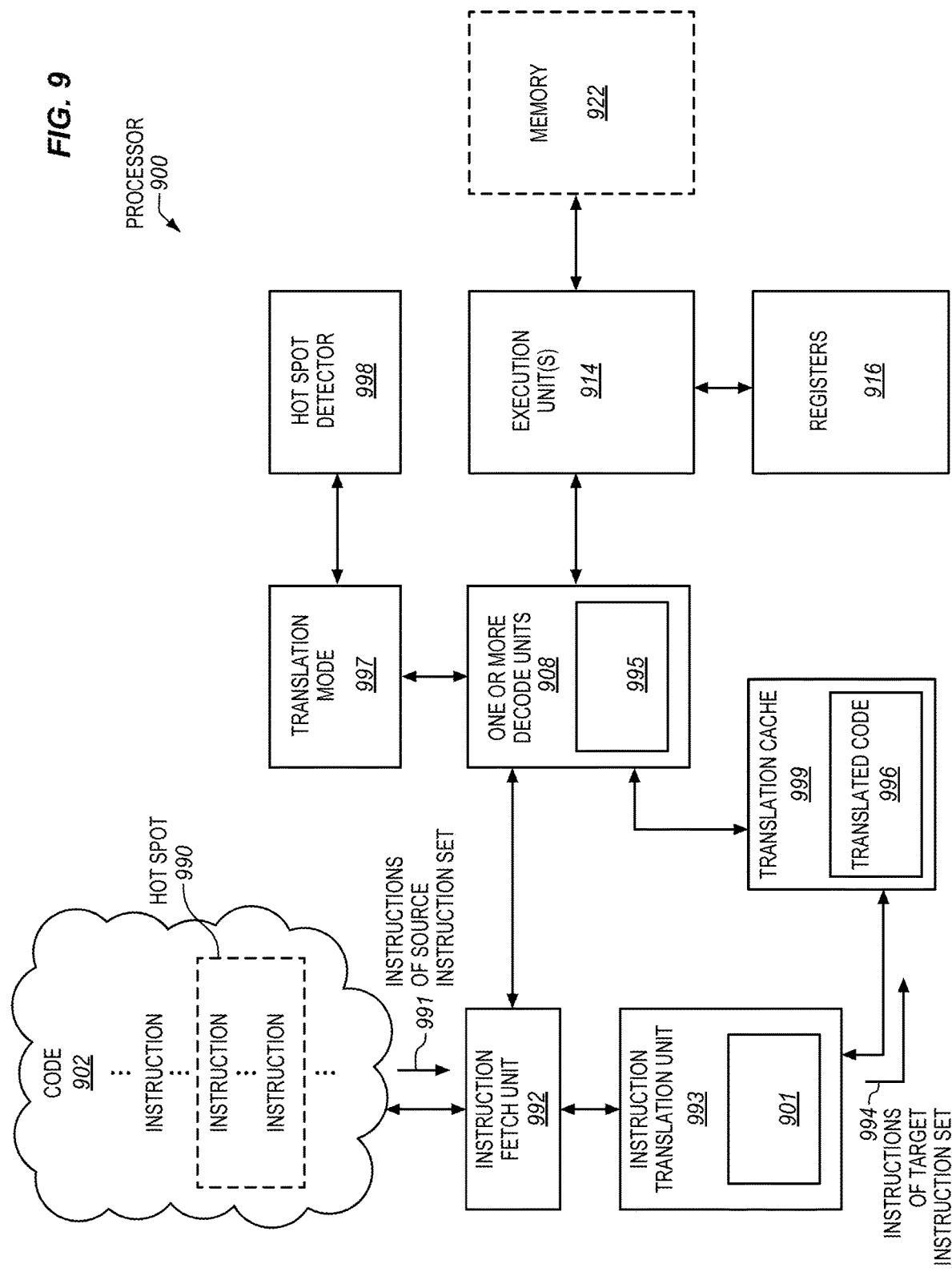

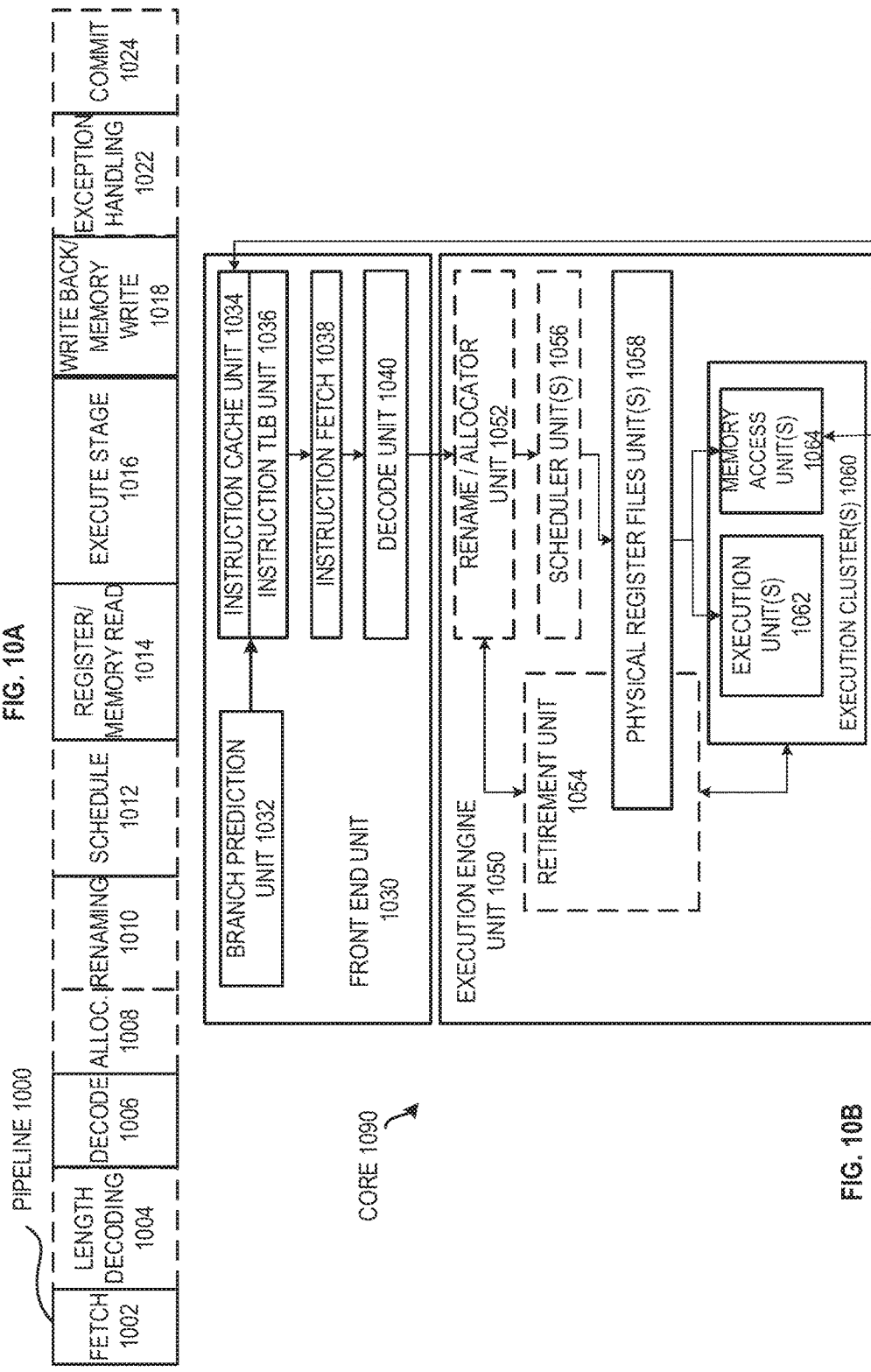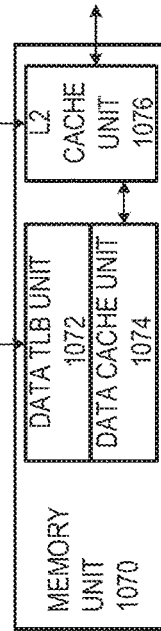

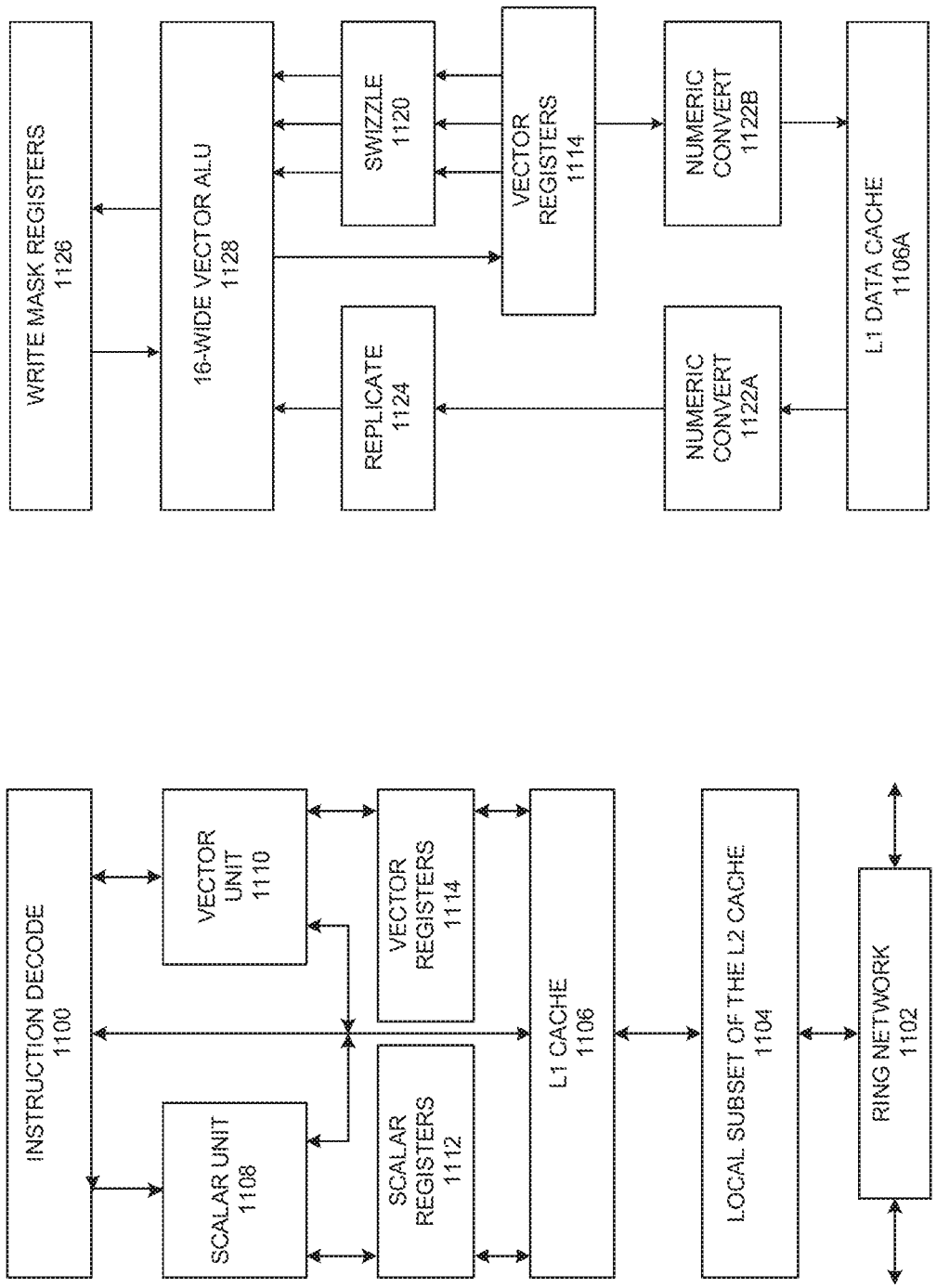

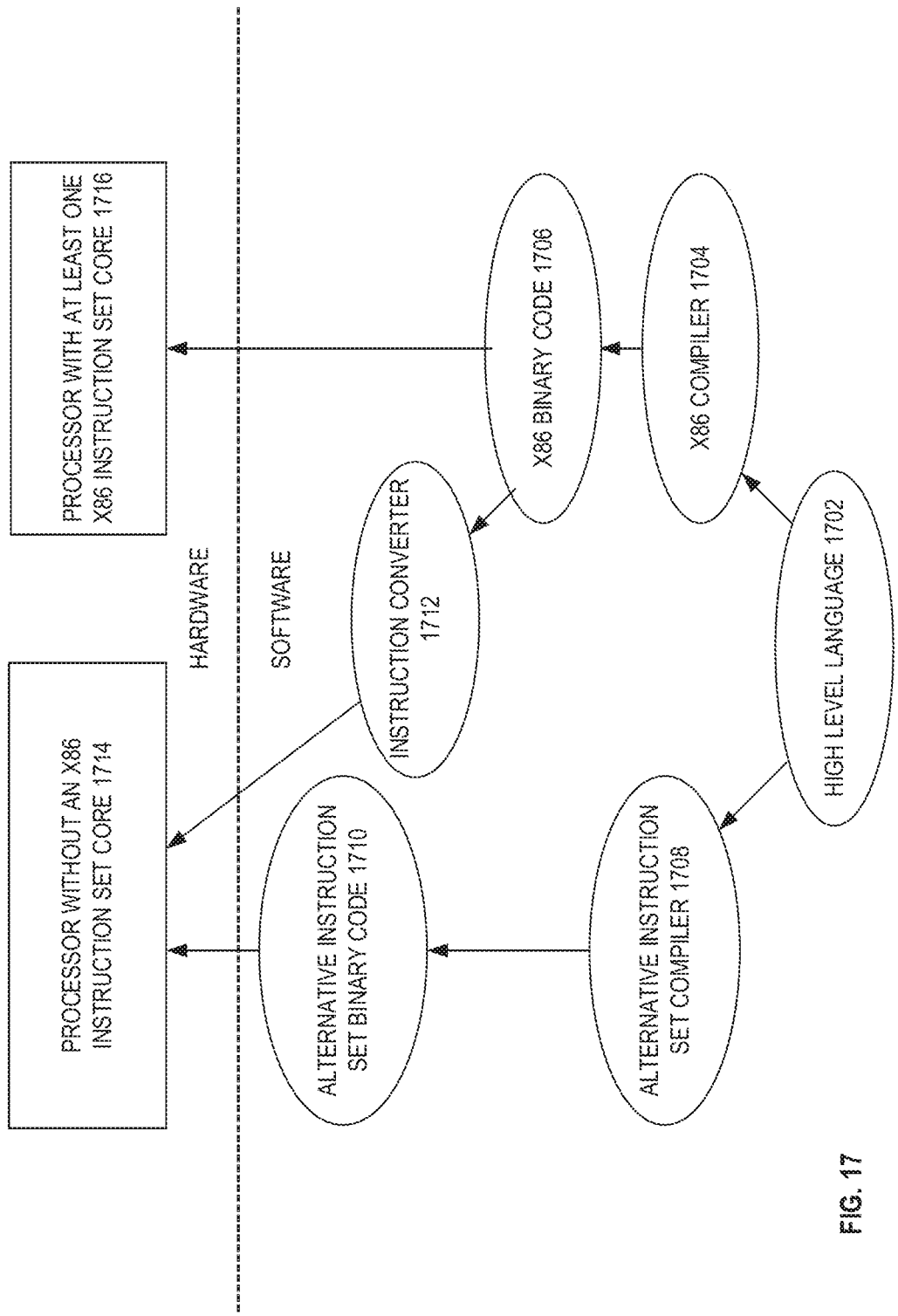

PROCESSORS, METHODS, SYSTEMS, AND INSTRUCTION CONVERSION MODULES FOR INSTRUCTIONS WITH COMPACT INSTRUCTION ENCODINGS DUE TO USE OF CONTEXT OF A PRIOR INSTRUCTION

BACKGROUND

Technical Field

Embodiments described herein generally relate to processors. In particular, embodiments described herein generally relate to processors to perform instructions having compact instruction encodings.

Background Information

Processors generally have instruction sets that include the various different types of instructions that they are natively able to decode and perform. The instructions of the instruction set may represent macroinstructions, machine language instructions, or other such instructions or control signals.

Each instruction of the instruction set may have a corresponding length in bits. Some instructions sets are fixed length instruction sets in which each instruction has a fixed length (e.g., four 8-bit bytes). Other instruction sets are variable length instruction sets in which the lengths of the instructions may vary. Commonly, most instructions have a length ranging from about one to eight bytes.

The bits of each instruction may follow an instruction encoding or format that determines how the bits are arranged into the one or more fields. For example, the encoding or format may specify the locations of the fields and the number of bits of each field. The encoding or format determines how the processor is to interpret the bits of the instruction.

Generally, each instruction has an operation code or opcode to at least party identify the instruction or operation (e.g., as a particular arithmetic or logical instruction). Depending upon the particular instruction, one or more fields may also be used to specify one or more storage areas or locations for one or more source and/or destination operands of the instruction. Representatively, many data processing instructions have at least one source operand, and at least one destination operand. Each field generally tends to increase the length of the instruction.

BRIEF DESCRIPTION OF THE DRAWINGS

The invention may best be understood by referring to the following description and accompanying drawings that are used to illustrate embodiments. In the drawings:

FIG. 9 is a block diagram of an embodiment of a processor having an instruction translation unit to translate instructions of a source instruction set to instructions of a target instruction set.

FIG. 10A is a block diagram illustrating an embodiment of an in-order pipeline and an embodiment of a register renaming out-of-order issue/execution pipeline.

FIG. 10B is a block diagram of an embodiment of processor core including a front end unit coupled to an execution engine unit and both coupled to a memory unit.

FIG. 11A is a block diagram of an embodiment of a single processor core, along with its connection to the on-die interconnect network, and with its local subset of the Level 2 (L2) cache.

FIG. 11B is a block diagram of an embodiment of an expanded view of part of the processor core of FIG. 11A.

FIG. 17 is a block diagram of use of a software instruction converter to convert binary instructions in a source instruction set to binary instructions in a target instruction set, according to embodiments of the invention.

DETAILED DESCRIPTION OF EMBODIMENTS

Disclosed herein are embodiments of instructions having compact instruction encodings, processors to decode the instructions, methods by the processors when decoding the instructions, systems incorporating one or more processors to decode the instructions, machine-readable mediums providing the instructions, and modules to convert other instructions into the instructions. In the following description, numerous specific details are set forth (e.g., specific instruction formats, numbers of registers, types of parameters used by instructions, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
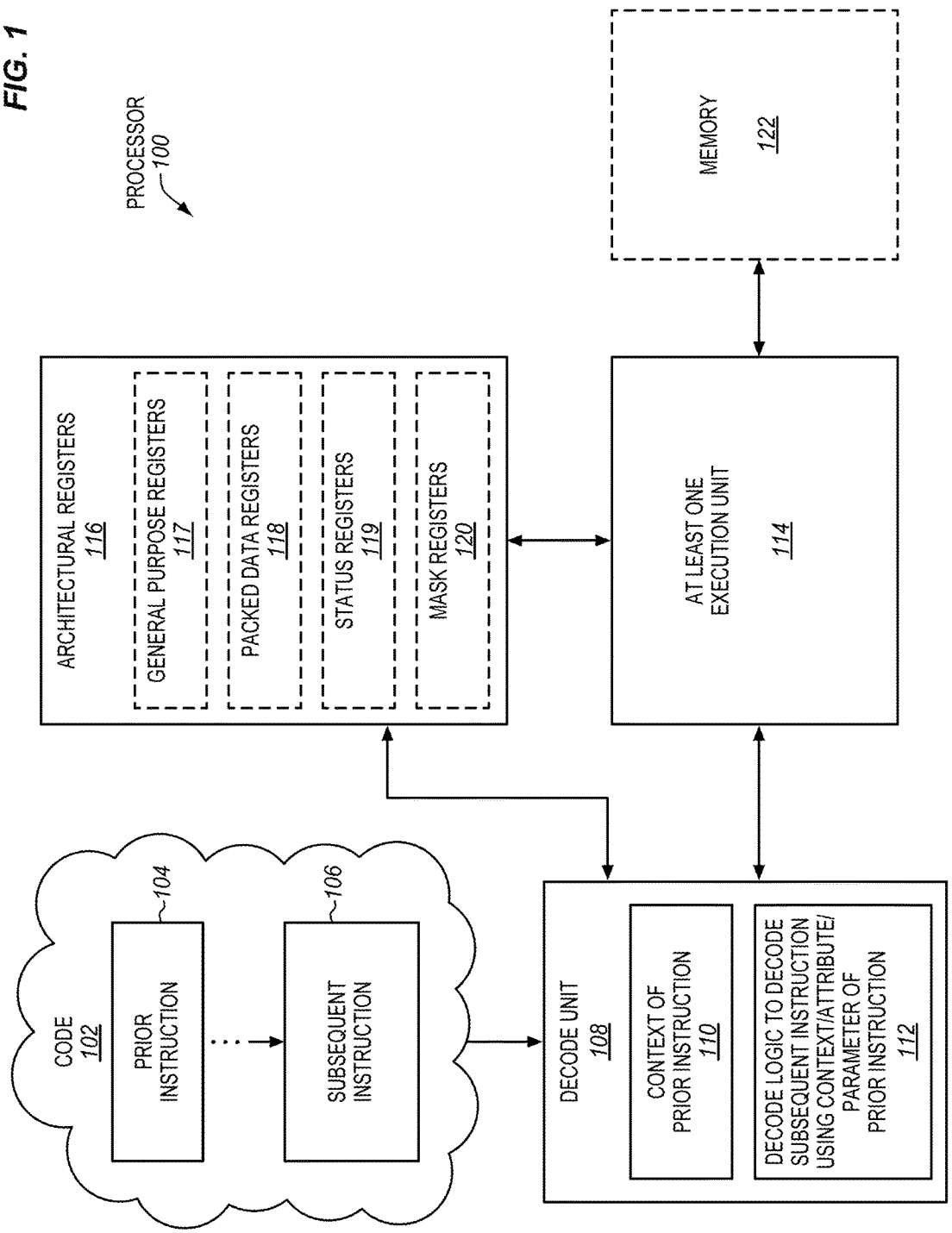
FIG. 1 is a block diagram of an embodiment of a processor.

FIG. 1 is a block diagram of an embodiment of a processor 100. In some embodiments, the processor may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, other types of architectures, hybrid architectures, or have a combination of different architectures (e.g., different cores may have different architectures). In some embodiments, the processor may include (e.g., be disposed on) at least one integrated circuit or semiconductor die. In some embodiments, the processor may include at least some hardware (e.g., transistors, circuitry, non-volatile memory storing circuit-level instructions, or the like).

During operation and/or if running, the processor 100 may receive code 102 that is to be performed. The code may include instructions that are part of an instruction set of the processor. The instructions of the instruction set may represent macroinstructions, machine language instructions, or other instructions or control signals that the processor is natively able to decode. These instructions are contrasted to microinstructions, micro-operations, micro-ops, micro-code entry points, or other decoded instructions or control signals, which may result from the instructions of the instruction set being decoded. The instructions may be any of various different types found in instruction sets.

In some embodiments, the code 102 may include a "prior" instruction 104 (which may be of various different types) and a "subsequent" instruction 106 (which may also be of various different types and may be the same as or different than the prior instruction). The prior instruction occurs prior to (e.g., immediately before) the subsequent instruction in original program order, and the subsequent instruction occurs subsequent to (e.g., immediately after) the prior instruction in the original program order. At least in in-order portions of the processor, the prior instruction may be processed before the subsequent instruction. For example, the prior instruction may be decoded before the subsequent instruction, the prior instruction may be committed (e.g., retired) before the subsequent instruction, etc. As used herein, the terms "prior," "subsequent," "before," "after," and the like, are relative terms not absolute terms, and which are relative to one another (e.g., the prior instruction is before the subsequent instruction).

Each instruction of the instruction set may have a corresponding length in bits. The bits of each instruction may follow an instruction encoding or format that determines how the bits are arranged into the one or more fields (e.g., by specifying the locations and numbers of bits of each field). As used herein, a field may include one or more bits that may either be contiguous or separated, but logically are part of the same field. The instruction encoding or format indicates how these bits or fields are to be interpreted by the processor (e.g., decode unit 108).

Each instruction generally has an operation code or opcode to at least party identify the instruction or operation (e.g., as a particular arithmetic or logical instruction). In some cases, one or more additional fields may further specify the operation (e.g., a data size field, a field to indicate if the operation is signed or unsigned, a field to indicate whether the operation is to use saturation, a field to indicate how flags are to be modified, etc.). Depending upon the particular instruction, one or more fields may also be used to specify one or more storage areas or locations for one or more source and/or destination operands of the instruction. As one specific example, an add instruction may have a first source operand specification field to specify a first source register, a second source operand specification field to specify a second source register, and a destination operand specification field to specify a destination register. This represents a non-destructive format in which the destination register is always allowed to be distinct from the source registers. In other cases, instead of a separate field to specify the destination operand, it may be implicit (e.g., inherent) to the instruction that the same source/destination register initially be used for a source operand, and then subsequently be reused for the destination operand.

Referring again to FIG. 1, the processor also includes one or more sets of architectural registers 116. There may optionally be different types of architectural registers, such as, for example, an optional set of general-purpose registers 117, an optional set of packed data registers 118 (sometimes also referred to as single instruction, multiple data (SIMD) or vector registers), an optional status register 119 (sometimes also referred to as a flags or condition code register), and an optional set of mask registers 120 for predication. In another embodiment, certain of these registers may optionally be omitted.

The architectural registers 116 are a part of the instruction set architecture (ISA) of the processor and may represent architecturally-visible registers that are visible to software and/or a programmer and/or are the registers that are indicated by instructions of the instruction set to identify operands. These architectural registers are contrasted to other non-architectural registers in a given microarchitecture (e.g., temporary registers, reorder buffers, retirement registers, etc.). The architectural registers may be implemented in different ways in different microarchitectures, and are not limited to any particular type of design. Examples of suitable ways include, but are not limited to, dedicated physical registers, dynamically allocated physical registers using register renaming, and combinations thereof. As used herein, the terms register, register file, and the like, are used to refer to architectural registers. When appropriate, additional adjectives will be used to refer to non-architectural registers (e.g., temporary registers, reorder buffers, retirement registers, etc.).

Referring again to FIG. 1, the processor 100 also includes a decode unit 108. The decode unit may also be referred to as an instruction decoder or simply a decoder. The decode unit may receive and decode the instructions of the instruction set. For each instruction, the decode unit may output one or more relatively lower-level instructions or control signals (e.g., one or more microinstructions, micro-operations, micro-ops, micro-code entry points, or other decoded instructions or control signals), which reflect, represent, and/or are derived from the relatively higher-level instruction of the instruction set. In some embodiments, the decode unit may include one or more input structures (e.g., port(s), interconnect(s), an interface) to receive the instructions of the instruction set, instruction recognition and decode logic coupled therewith to recognize and decode the input instructions, and one or more output structures (e.g., port(s), interconnect(s), an interface) coupled therewith to output the decoded lower-level instruction(s) or control signal(s). The decode unit may be implemented using various different mechanisms including, but not limited to, microcode read only memories (ROMs), look-up tables, hardware implementations, programmable logic arrays (PLAs), other mechanisms suitable to implement decode units, and combinations thereof. In some embodiments, the decode unit may be included on a die or integrated circuit (e.g., on a die or integrated circuit with the execution unit 114 and/or the registers 116). In some embodiments, the decode unit may include at least some hardware (e.g., transistors, integrated circuitry, on-die ROM or other non-volatile memory storing microcode or other circuit-level instructions, or various combinations thereof).

In some embodiments, at least one instruction of the instruction set (e.g., the subsequent instruction 106) may use one or more of the approaches disclosed herein to help to shorten or compact its instruction length or encoding. In some embodiments, the subsequent instruction 106, in order to help shorten its instruction length, may leverage and/or reuse, or at least partly leverage and/or reuse, a parameter, attribute, or other context or information pertaining to the prior instruction 104. In some embodiments, the information or context of a given instructions predecessor(s) in the control flow may allow information or context for the given instruction to either be encoded with fewer bits or left completely implicit.

In some embodiments, the decode unit 108 (e.g., after starting to decode the prior instruction) may preserve or store the information or context 110 of the prior instruction, so that such context can be leveraged and/or reused by the subsequent instruction. For example, the decode unit may have and/or may otherwise be coupled with, one or more microarchitectural registers, a scratchpad memory, a local or private microarchitectural cache, memory, or other storage, or other storage location, suitable for storing such context. The decode unit may include decode logic 112 to decode the subsequent instruction 106 by leveraging and/or reusing, or at least partly leveraging and/or reusing, the preserved context 110. The context 110 does not necessarily need to be stored at or near the decoder, but may generally be recoverable during decode time and/or at a decode stage of the pipeline. The decode logic 112 may be implemented in hardware (e.g., integrated circuitry, transistors, or other circuit elements, etc.), firmware (e.g., read-only memory (ROM), erasable programmable read-only memory (EPROM), flash memory, or other non-volatile memory and microcode, microinstructions, or other circuit-level instructions stored therein), or a combination thereof. Any of the various different types of context disclosed elsewhere herein, and ways in which it may be at least partly leveraged and/or reused, are suitable.

Advantageously, at least partly leveraging and/or reusing such context 110 may help to provide a compact instruction encoding and/or shorten the instruction length of the subsequent instruction 106. The short instruction length or compact instruction encoding may tend to offer one or more advantages depending upon the particular implementation. For one thing, it may tend to help to increase code density, which may allow relatively more code (e.g., relatively more instructions) to be stored in relatively less storage (e.g., caches, system memory, etc.). For another thing, it may also tend to help reduce the amount of interconnect bandwidth needed to move instructions up the memory hierarchy and/or the amount of energy needed to do so. Further, longer instruction lengths may tend to increase the complexity of the decode unit, which may tend to reduce the decode rate and/or increase power consumption and/or increase die area.

Referring again to FIG. 1, the processor may include at least one execution unit 114. Commonly there may be multiple execution units of different types. Examples of suitable execution units include, but are not limited to, arithmetic units, logic units, arithmetic and/or logical units (ALUs), packed, single-instruction, multiple data (SIMD), or vector execution units, floating point execution units, load and/or store units, memory access units, address generation units, branch execution units, although the scope of the invention is not limited to any particular type. Each of the execution units may be coupled with the decode unit 108. In some embodiments, each of the execution units may be monolithically integrated on a die or integrated circuit with the decode unit. Each execution unit 114 may receive the one or more decoded or otherwise converted instructions or control signals that have been decoded and/or derived from the instruction of the instruction set that it is performing. Each execution unit may be operative in response to and/or as a result of the instruction it is performing (e.g., in response to one or more instructions or control signals decoded from the instruction and/or in response to the instruction being decoded and/or in response to the instruction being provided to a decoder) to perform the operation(s) specified or associated with that instruction. Each execution unit may include specific or particular logic (e.g., transistors, integrated circuitry, or other hardware potentially combined with firmware (e.g., instructions or control signals stored in non-volatile memory) and/or software) that is operative to perform the instruction.

In the case of data processing instructions and/or other instructions that have one or more operands of data to be processed, each of the execution units may also be coupled to receive the operand(s) associated with the instruction it is to perform. For example, the execution unit may be coupled with the registers 116 in order to be able to access operand(s) stored therein. Likewise, the execution unit may be operative to be coupled with the memory 122 in order to be able to access memory operand(s) stored in the memory. In the illustration, the memory is shown in dashed lines to indicate that it may optionally be separate from the processor (e.g., a separate device that may be coupled with the processor when they are both deployed in a system. Embodiments of the invention pertain to the processor alone, before it is coupled with the memory.

To avoid obscuring the description, a simple processor 100 has been shown and described, although the processor may optionally include other components. For example, various embodiments may include various combinations and configurations of the components shown and described for any of FIGS. 10B, 11A, 11B, 12. Such components may be coupled with one another and other components to allow them to operate. By way of example, considering FIG. 10B, the instruction cache 1034 may cache instructions, the instruction fetch unit 1038 may fetch instructions, the decode unit 1040 may decode instructions, the scheduler unit 1056 may schedule operations of the instructions, one of the execution units 1062 may perform the instructions, the retirement unit 1054 may retire the instructions, etc. These instructions may include the prior and subsequent instructions previously described.

Figure 2:
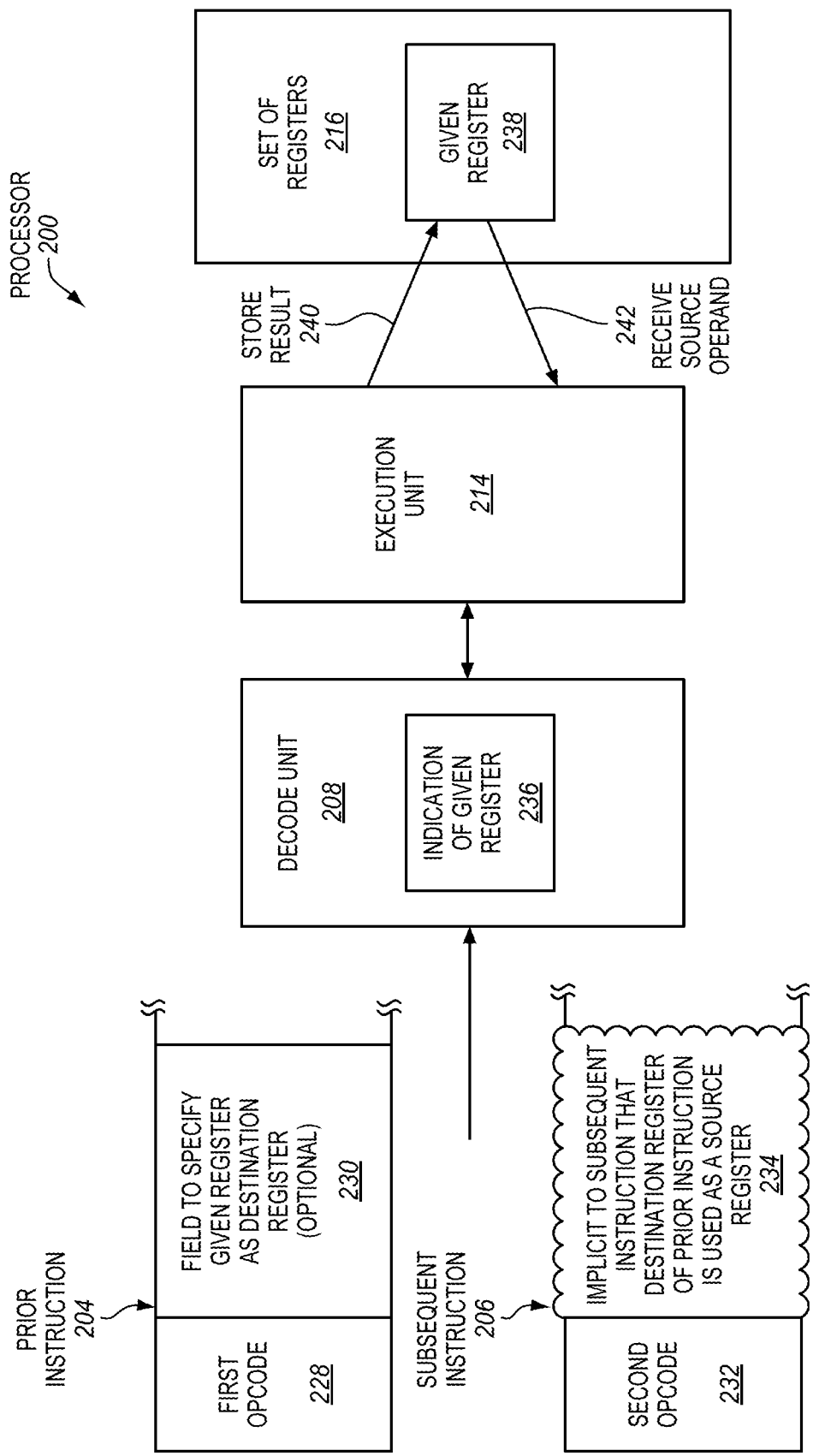
FIG. 2 is a block diagram of an embodiment of a processor that is operative to perform an embodiment of a subsequent instruction that implicitly indicates that a destination register of a prior instruction is to be reused as one its source register.

FIG. 2 is a block diagram of an embodiment of a processor 200 that is operative to perform an embodiment of a subsequent instruction 206 that implicitly indicates that a destination register of a prior instruction is to be reused as its source register. The processor includes a decode unit 208, an execution unit 214, and a set of registers 216. These components may optionally be similar to, or the same as, the correspondingly named components of FIG. 1. To avoid obscuring the description, the different and/or additional characteristics and features pertaining to FIG. 2 will primarily be described, without repeating all the characteristics and features that may optionally be similar to, or the same as, those described for FIG. 1.

During operation and/or when in use, the prior instruction 204 may be provided to the decode unit 208. The prior instruction has a first opcode 228. The first opcode may correspond to any of a wide variety of different types of operations that involve storing a result or data in a destination register. Examples of possible operations include, but are not limited to, those corresponding to various arithmetic instructions, logical instructions, cryptographic instructions, load instructions (e.g., to load data from memory into one or more destination registers), register move instructions (e.g., to move data from source register(s) to destination register(s)), and the like. In the illustrated example, the prior instruction also has an optional field 230 to explicitly specify the given register 238, which may be used as the prior instructions destination register where a result or other data is to be stored when the prior instruction is performed. For example, the field may represent a register index or other register identifier field to provide a register index or other register identifier that has enough bits to select any one of the registers in the set of registers 216. By way of example, a 4-bit register index field may select any one of sixteen registers, a 5-bit field may select any one of thirty-two registers, and a 6-bit field may select any one of sixty-four registers. Alternatively, instead of having the field to explicitly specify the given register, it may optionally be implicit to the prior instruction (e.g., inherent to the first opcode 228) that the given register is to be used as its destination register. For example, the prior instruction may have a fixed or static implicit destination register.

The decode unit 208 may decode the prior instruction 204. In some embodiments, the decode unit may be operative to store, preserve, or retain an indication 236 of the given register 238. As one example, the decode unit may store the bits of the field 230 and/or a register index or other register identifier for the given register. The previously described types of storage locations are suitable for storing such context of the prior instruction. The decode unit may provide one or more decoded instructions to the execution unit 214 in order to cause the execution unit to perform the prior instruction and access 240 the given register.

The decode unit may also decode the subsequent instruction 206. The subsequent instruction has a second opcode 232. The second opcode may correspond to any of a wide variety of different types of operations that involve accessing a source operand or data from a source register. Examples of possible operations include, but are not limited to, those corresponding to various arithmetic instructions, logical instructions, cryptographic instructions, store instructions (e.g., to store data from a source register to memory), register move instructions (e.g., to move data from source register(s) to destination register(s)), and the like. The second opcode may either be the same as or different than the first opcode.

In some embodiments, it may be implicit to the subsequent instruction 206 (e.g., inherent or otherwise implicit to the second opcode 232) that the given register 238 (which was used as the destination register of the prior instruction 204) is to be reused as a source register by the subsequent instruction 206. In such embodiments, the decode unit and/or the processor may inherently, impliedly, or otherwise implicitly understand that the subsequent instruction is to inherit and reuse this same given register, even though the subsequent instruction may not have a field or any bits to explicitly specify the given register. Since the same given register is to be reused, the decode unit and/or the processor may simply remember this given register (e.g., through the stored indication 236), and understand that the same given register is to be reused for the subsequent instruction. The decode unit may be operative to use the previously preserved indication 236 to identify the given register, which is to be used as the source register for the subsequent instruction. In the illustration, wavy lines are used to denote that such reuse of the given register may be implicit rather than being explicitly specified through a field.

In some embodiments, the given register 238 may be allowed to be flexible or variable, as opposed to being any particular fixed or static register. As one example, the subsequent instruction may allow the prior instruction to indicate its destination register as any one of the general-purpose x86 registers (e.g., RAX, RDX, etc.), rather than requiring the use of any specific one of these registers. Whatever given register the prior instruction happens to use for its destination, it may implicit to the subsequent instruction that the same given register is to be reused as its source register. Without limitation, the subsequent instruction may also optionally have other fields (e.g., one or more fields to specify one or more source operands), which are not described to avoid obscuring the description.

Such implicit reuse may take advantage of a prevalent pattern in code that a result or destination operand stored in a destination register by a prior instruction is often used as an input or source operand of a subsequent instruction (e.g., which may perform further processing on the data). As one illustrative example, the prior instruction may be a multiply instruction which may multiply a value (A) and a value (B) that are provided in its source operands, and store the product (A*B) in its destination register. In some cases, the multiply instruction may have a field to explicitly specify the destination register. Continuing with this example, the immediately subsequent instruction may be an add instruction which may add the product (A*B) to a value (C). In some embodiments, it may be implicit to the add instruction to reuse the destination register of the immediately prior multiply instruction as one of its source registers. This may avoid needing to have a field in the add instruction to specify the register. The add instruction may optionally/potentially explicitly specify another register having a value (C), and may optionally/potentially explicitly specify or otherwise indicate a destination register where the sum (A*B+C) is to be stored. By extension, it may be implicit to another instruction that follows the add instruction to reuse the destination register of the add instruction as one of its source registers, and so on. In some embodiments, an instruction set may optionally have from multiple to many different instructions that may take advantage of such implicit register reuse. Alternatively, as few as a single instruction (e.g., for which it is advantageous to shorten its instruction length) may support such implicit register reuse.

Figure 3:
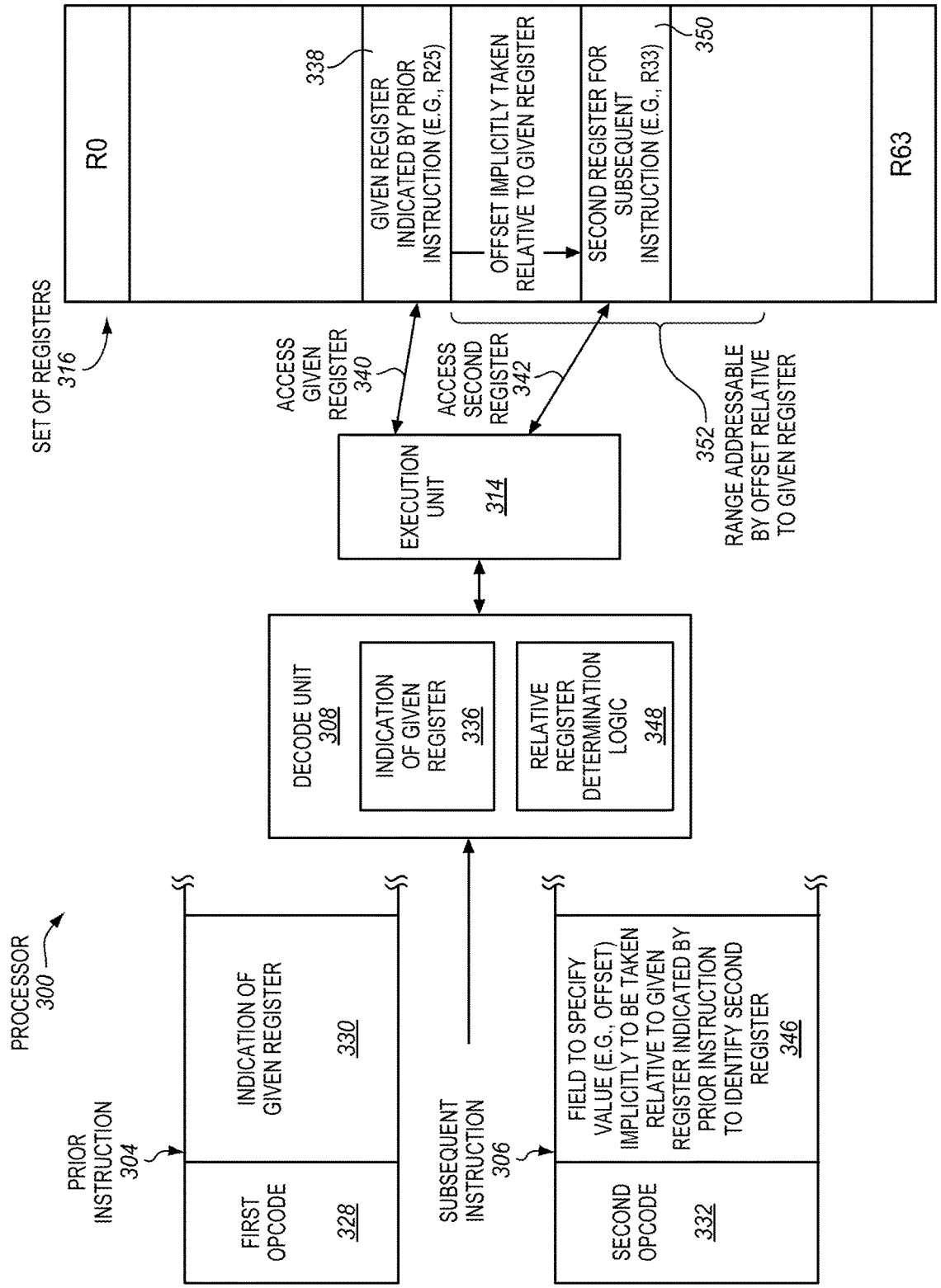
FIG. 3 is a block diagram of an embodiment of a processor that is operative to perform an embodiment of a subsequent instruction that has a field to specify an offset that is implicitly to be taken relative to a given register of a prior instruction in order to identify a register that is to be used by the subsequent instruction.
Figure 4:
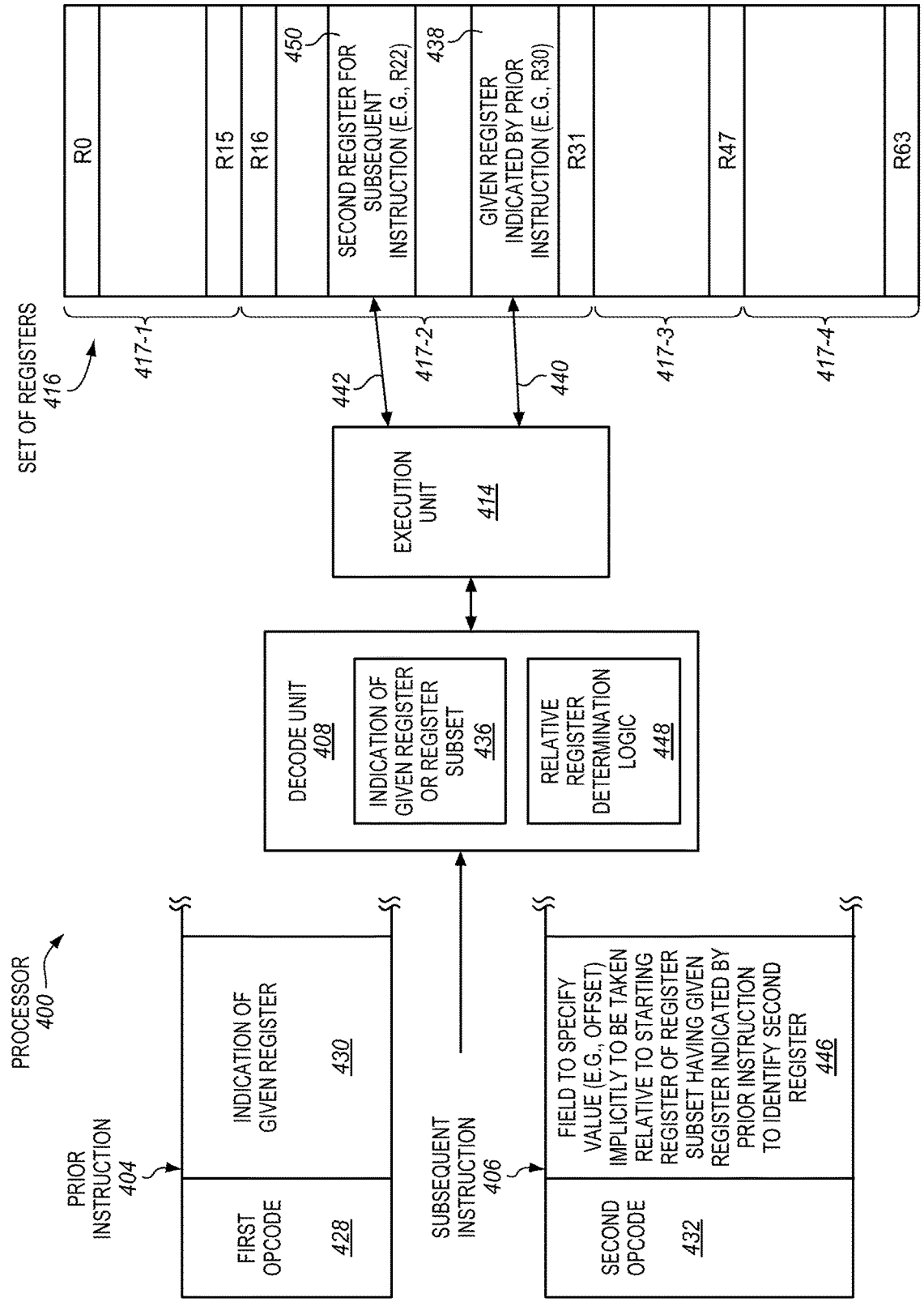
FIG. 4 is a block diagram of an embodiment of a processor that is operative to perform an embodiment of a subsequent instruction that has a field to specify an offset that is implicitly to be taken relative to a register subset having a given register of a prior instruction in order to identify a register that is to be used by the subsequent instruction.

FIG. 2 illustrates an embodiment where context of the prior instruction (e.g., its destination register) may be directly reused by the subsequent instruction. In other embodiments, the prior instruction may provide context that is used at least in part to derive context for the subsequent instruction. In some embodiments, this may allow the context of the subsequent instruction to be derived with less bits than would otherwise be needed to specify the context of the subsequent instruction if the context of the prior instruction was not leveraged or reused. For example, the context of the prior instruction may serve as a reference point or starting point to derive the corresponding context of the subsequent instruction. FIGS. 3-4 show two example approaches where a register of the subsequent instruction may be at least partly derived from and/or based on a register of the prior instruction.

FIG. 3 is a block diagram of an embodiment of a processor 300 that is operative to perform an embodiment of a subsequent instruction 306 that has a field 346 to specify a value (e.g., an offset) that is implicitly to be taken relative to a given register 338 of a prior instruction 304 in order to identify a second register 350 that is to be used by the subsequent instruction 306. The processor includes a decode unit 308, an execution unit 314, and a set of registers 316. These components may optionally be similar to, or the same as, the correspondingly named components of FIG. 1. To avoid obscuring the description, the different and/or additional characteristics and features of the embodiment of FIG. 3 will primarily be described, without repeating all the characteristics and features that may optionally be similar to, or the same as, those described for FIG. 1.

During operation and/or when in use, the prior instruction 304 may be provided to the decode unit 308. The prior instruction has a first opcode 328. The first opcode may correspond to any of a wide variety of different types of operations that involve at least the given register 338 as a source register and/or a destination register. At least the types of instructions previously mentioned for FIG. 2 are suitable. The prior instruction may also have or provide an indication 330 of the given register 338. The indication 330 may either be explicit (e.g., the instruction may have a register index or other identifier field to specify a register index or otherwise identify the given register), or implicit (e.g., the prior instruction may implicitly indicate the given register). In the illustrated example, the given register is the twenty-sixth register R25 of the set of sixty-four registers labeled R0-R63, although this is only one illustrative example. It may be convenient for the given register to be a destination register of the prior instruction, although this is not required. Without limitation, the prior instruction may also optionally have other fields (e.g., one or more fields to specify one or more source operands), which are not described in order to avoid obscuring the description.

The decode unit 308 may be operative to decode the prior instruction 304. In some embodiments, the decode unit may be operative to store, preserve, or retain an indication 336 of the given register 338 (e.g., a register index or other register identifier for the given register). The previously described ways of storing or preserving such context are suitable. The decode unit may provide one or more decoded instructions to the execution unit 314 in order to cause the execution unit to perform the prior instruction and access 340 the given register.

The decode unit 308 may also decode the subsequent instruction 306. The subsequent instruction has a second opcode 332. The types of instructions previously mentioned for FIG. 2 are generally suitable. The second opcode may either be the same as, or different than, the first opcode 328.

In some embodiments, the subsequent instruction 306 may have the field 346 in its instruction encoding to explicitly specify the value, for example an offset, which is inherently or implicitly to be taken relative to the given register 338 indicated by the prior instruction, in order to identify the second register 350, which is to be used by the subsequent instruction 306. By way of example, the offset or other value may represent a number of registers, a number of register indices, or other displacement or offset in an integer number of registers. Conventionally, a register index or register identifier is typically taken relative to the base architectural register at the zeroth or lowest valued register index or position (e.g., R0). However, in some embodiments, the offset or other value may instead implicitly be taken relative to the given register 338 indicated by the prior instruction, whatever it may happen to be, as a starting point or reference point. The given register indicated by the prior instruction may be partly leveraged or reused as a reference point or starting point. Also, the given register may not be required to be any specific or fixed register, but rather the prior instruction may be permitted to flexibly specify different registers as the given register.

In some embodiments, the number of bits of the offset or other value provided by the field 346 of the subsequent instruction may be less than the total number of bits needed to select any one of the registers in the set of registers 316 and/or less than the number of bits of a register index or register identifier (e.g., the indication 330). Conventionally, a register index or register identifier typically has enough bits to index or otherwise select any one of the registers in the set of registers. To illustrate, in the illustrated example, there are sixty-four registers (R0-R63), and 6-bits would be needed to index or identify any one of these sixty-four registers, but in some embodiments the offset or value provided by the subsequent instruction may have less than 6-bits (e.g., only 2-bits, 3-bits, 4-bits, or 5-bits). In another embodiment, there may be thirty-two registers, and 5-bits would be needed to identify any one of the thirty-two registers, but the value provided by the subsequent instruction in some embodiments may have less than 5-bits (e.g., only 2-bits, 3-bits, or 4-bits). In yet another embodiment, there may be sixteen registers, and 4-bits may be needed to identify any one of the sixteen registers, but the value provided by the subsequent instruction in some embodiments may have less than 4-bits (e.g., only 2-bits or 3-bits).

The number of bits in the offset or other value may determine a range of registers 352, taken relative to the given register 338, which may be indexed or otherwise addressed by the offset or other value. As shown in the illustrated example, the range 352 is optionally only those registers after the given register (e.g., at higher register index positions). By way of example, a 3-bit offset may optionally be used to provide a range of eight registers after the given register that may be indexed or addressed relative to the given register. Or, a 4-bit offset may optionally be used to provide a range of sixteen registers after the given register that may be indexed or addressed relative to the given register. In other embodiments, the range of registers may optionally include registers both before the given register (e.g., at lower register index positions) and after the given register (e.g., at higher register index positions). For example, the offset or value may be a signed value in which negative values identify registers before the given register and positive values identify registers after the given register. The range of registers may not be fixed at any one position in the set of registers, but rather may move around relative to different given registers indicated by successive prior instructions. A programmer, a register allocation algorithm, compiler, or the like, may chose registers to exploit such a moving range of registers in order to help reduce the number of bits needed to specify registers.

Referring again to FIG. 3, the decode unit 308 may be operative to use the preserved indication 336 of the given register 338, and the offset or other value provided by the field 346 of the subsequent instruction 306, in order to determine the second register 350. As shown, the decode unit may optionally include relative register determination logic 348 to make such a determination. The relative register determination logic 348 may be implemented in hardware, firmware, or a combination thereof. The relative register determination logic and/or the decode unit may apply the offset or value relative to the given register in order to identify the second register. Representatively, for the illustrated example embodiment, an offset or value of integer eight may be added to otherwise applied to the register index for the twenty sixth register (R25), which is the given register in the illustrated example, in order to obtain the register index for the thirty fourth register (R33), which is the second register 350 in the illustrated example. The decode unit may also provide decoded instructions or control signals to the execution unit 314 to cause or control the execution unit to access 342 the second register. The second register may be used as a source register and/or a destination register for the subsequent instruction.

It is not required to use the given register 338 of the prior instruction 304 as the reference point or starting point to derive the second register 350 for the subsequent instruction 306. In other embodiments, a register associated with or corresponding to the given register may instead be used.

FIG. 4 is a block diagram of an embodiment of a processor 400 that is operative to perform an embodiment of a subsequent instruction 406 that has a field 446 to specify a value (e.g., an offset) that is implicitly to be taken relative to a register subset 417-2 having a given register 438 of a prior instruction 404 in order to identify a second register 450 that is to be used by the subsequent instruction. The embodiment of FIG. 4 has certain similarities to the embodiment of FIG. 3. In addition, the processor includes a decode unit 408, an execution unit 414, and a set of registers 416. These components may optionally be similar to, or the same as, the correspondingly named components of FIG. 1 and/or FIG. 3. To avoid obscuring the description, the different and/or additional characteristics and features of the embodiment of FIG. 4 will primarily be described, without repeating all the characteristics and features that may optionally be similar to, or the same as, those previously described.

In the embodiment of FIG. 4, the set of registers 416 may be logically partitioned into two or more subsets. For example, there may be two, four, eight, sixteen, or thirty-two subsets. Commonly the number of subsets may be a multiple of two, although there is no such requirement. In the particular illustrated example, the set of registers is optionally partitioned into four subsets 417 of sixteen sequential/consecutive registers each. A first subset 417-1 has registers R0-R15, a second subset 417-2 has registers R16-R31, a third subset 417-3 has registers R32-R47, and a fourth subset 417-4 has registers R48-R63. In another illustrative example embodiment, the set of registers may optionally be partitioned into sixteen subsets of four registers each.

During operation and/or when in use, the prior instruction 404 may be provided to the decode unit 408. The decode unit may be operative to decode the prior instruction. The prior instruction has a first opcode 428. The first opcode may correspond to any of a wide variety of different types of instructions that involve at least the given register 438 as a source register and/or a destination register. At least the types of instructions previously mentioned for FIG. 2 are suitable.

The prior instruction may also implicitly indicate or explicitly specify an indication 430 of the given register 438. The given register is not required to be any specific or fixed register, but rather may be allowed to be flexibly or variably specified by the prior instruction. In the illustrated example, the given register is the thirty-first register R30 of the set of sixty-four registers labeled R0-R63, although this is only one illustrative example. The given register may be included in one of the subsets. In the particular illustrated example, the given register R30 is in the second subset 417-2. In some embodiments, the decode unit may be operative to store, preserve, or retain a register index, register identifier, or other indication 436 of the given register 438 and/or the register subset 417-2 that includes the given register. The previously described ways of storing or preserving such context are suitable. The decode unit may provide one or more decoded instructions to the execution unit 414 in order to cause the execution unit to perform the prior instruction and access 440 the given register.

In some embodiments, a subset of most significant or highest order bits of the register index or identifier of the given register 438 may optionally be used to select the subset of registers 417-2 having the given register. For the illustrated example of four subsets, two most significant bits may be used to select any one of the four subsets. As another illustrative example, where there are sixteen subsets each having four sequential registers, four most significant bits of the register index or identifier of the given register may be used to select any one of these sixteen subsets. Such a subset of the most significant bits of the register index or register identifier represents another suitable embodiment of the indication 436 that may be stored or preserved.

The decode unit 408 may also decode the subsequent instruction 406. The subsequent instruction has a second opcode 432. At least the types of instructions previously mentioned for FIG. 2 are suitable. In some embodiments, the subsequent instruction may have the field 446 in its instruction encoding to explicitly specify the value, for example an offset, that is to be used to derive the second register 450, which is to be used by the subsequent instruction, based at least in part on the given register 438 indicated by the prior instruction. In some embodiments, it may be implicit to the second instruction to take the offset or other value relative to a register associated with, corresponding to, and/or within a register subset having the given register. By way of example, the starting register of the register subset, the last register of the register subset, the middle register of the register subset, or some other register within or associated with the register subset, may optionally be used by convention as the reference point or starting point. In the embodiment of FIG. 4, the starting register of the register subset is used, although the scope of the invention is not so limited.

The decode unit 408 may be operative to use the preserved indication 436 of the given register 438 and/or its register subset 417-2, and the offset or other value provided by the field 446 of the subsequent instruction 406, in order to determine the second register 450. As shown, the decode unit may optionally include relative register determination logic 448 to make such a determination. The relative register determination logic and/or the decode unit may apply the offset relative to the reference register (e.g., the starting register) of the appropriate register subset in order to identify the second register.

The number of bits of the offset or other value provided by the field 446 of the subsequent instruction may be less than the total number of bits needed to select any one of the registers in the set of registers 416 (e.g., less than the total number of bits needed for a full register index or other register identifier and/or of the indication 430). The number of bits in the offset or other value may determine a range of registers, taken relative to the reference register of the register subset, which may be indexed or otherwise addressed by the offset or other value. In some embodiments, the offset or value may optionally have only enough bits to select any one of the registers in the register subset, although this is not required. In various embodiments, the range may be only registers after the reference register that can be indexed by the offset, only registers before the reference register that can be indexed by the offset, or only registers centered about the reference register that can be indexed by the offset.

To further illustrate, for the illustrated example of four subsets, two most significant bits of a register identifier for the given register may be used to select any one of the four subsets. In such a case, the offset or value provided by the subsequent instruction may optionally have four additional bits that may be used to select any one of the sixteen sequential registers in the selected subset. As another illustrative example, where there are sixteen subsets, each having four sequential registers, four most significant bits of the register identifier of the given register may be used to select any one of the sixteen subsets. In such a case, the offset or value provided by the subsequent instruction may optionally have two additional least significant bits, which may be used to select any one of the four sequential registers in the selected subset. Alternatively, fewer bits may optionally be used to select only some of these registers of the selected subset. In the particular illustrated example, an offset or other value of integer six may be applied to the seventeenth register (R16), which in this example is the starting register for the second subset 417-2 having the given register R30, in order to obtain the twenty third register (R22) as the second register. One potential advantage to using the most significant bits to select the subset is that it may tend to provide faster and/or higher throughput alternative to performing arithmetic or signed arithmetic to apply the offset.

The decode unit 408 may also provide decoded instructions or control signals to the execution unit 414 to cause or control the execution unit to access 442 the second register when performing the subsequent instruction. The second register may be used as a source register and/or a destination register for the subsequent instruction.

In some embodiments, two or more of the approaches of FIGS. 2-4 may optionally be combined. Further, in the illustrative examples of FIGS. 3-4, it has only been described that a single additional register be derived for the subsequent instruction based at least in part on a register indicated by the prior instruction. However, it is also possible to derive two or more registers for the subsequent instruction using such an approach. For example, the subsequent instruction may optionally have two or more fields to specify two or more offsets or other values that are each to be applied based on either the same or a different register of the prior instruction.

To further illustrate, in one example embodiment, a first subsequent instruction may have a first source register that is to be derived (e.g., using the approach of FIG. 3 or FIG. 4) from a given register indicated by its immediately prior instruction with a first offset the first subsequent instruction specifies, a second source register that is to be derived from the same given register with a second offset the first subsequent instruction specifies, and a destination register that is to be derived from the same given register with a third offset the first subsequent instruction specifies. By way of example, if 3-bit offsets are used, only 9-bits may be needed for all three offsets, whereas in the case of sixty-four registers 6-bits would be needed for each of three register indices representing in total 18-bits.

In another example embodiment, a second subsequent instruction may have a first source register that is implicitly to be the same as the destination register of its immediately prior instruction (e.g., using the approach of FIG. 2), a second source register that is to be derived (e.g., using the approach of FIG. 3 or FIG. 4) from a given register (e.g., which may optionally be a destination register) indicated by the immediately prior instruction with a first offset the second subsequent instruction specifies, and a destination register that is to be derived from the same given register with a second offset the second subsequent instruction specifies. By way of example, if 3-bit offsets are used, only 6-bits may be needed for the two offsets, and the first source register may be completely implicit (i.e., requiring no bits), which leaves 10-bits in a two byte instruction for the opcode and other fields.

In yet another example embodiment, a third subsequent instruction may have a first source register that is implicitly to be the same as the destination register of its immediately prior instruction (e.g., using the approach of FIG. 2), a second source register that is to be derived (e.g., using the approach of FIG. 3 or FIG. 4) from a source register indicated by the immediately prior instruction with a first offset the third subsequent instruction specifies, and a destination register that is to be derived from a destination register indicated by the immediately prior instruction with a second offset the third subsequent instruction specifies.

There are various other types of context, besides just a register used by a prior instruction, which may be leveraged and/or reused by a subsequent instruction. For example, this may broadly be the case whenever a given context has not changed from a prior instruction to a subsequent instruction (which does not necessarily need to be the immediately subsequent instruction), and remains pertinent to the subsequent instruction. In some cases, certain types of context may tend to remain unchanged and pertinent to at least one subsequent instruction, or potentially even over a long expanse of subsequent instructions. In some embodiments, instead of re-specifying such context, it may be made inherent or implicit that the subsequent instruction is to inherit and/or reuse such context. As a result, no additional bits may be needed in the encoding of the subsequent instruction to re-specify such context.

Figure 5:
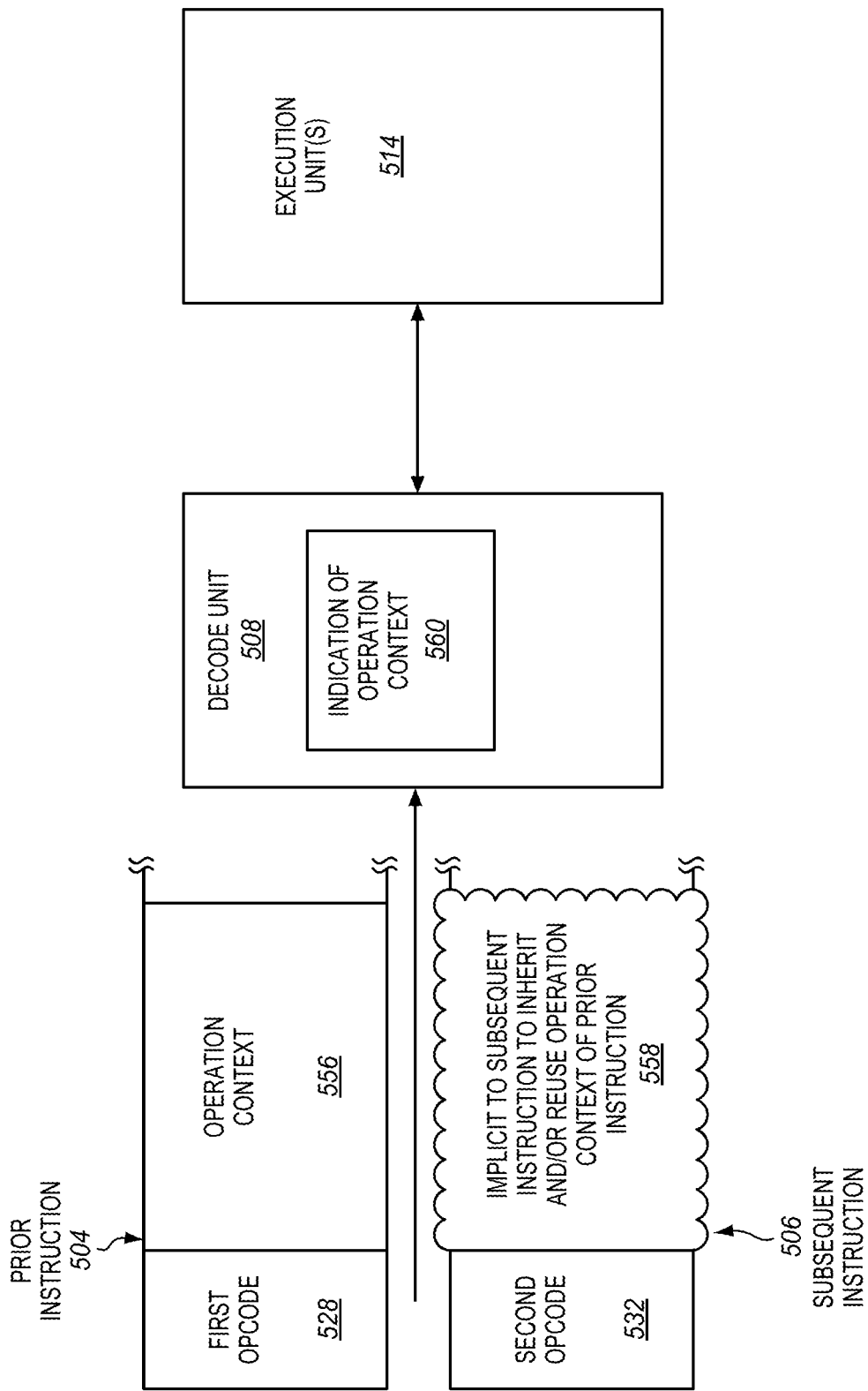
FIG. 5 is a block diagram of an embodiment of a processor that is operative to perform an embodiment of a subsequent instruction for which it is implicit to inherit and/or reuse at least some operation context of a prior instruction.

FIG. 5 is a block diagram of an embodiment of a processor 500 that is operative to perform an embodiment of a subsequent instruction 506 for which it is implicit 558 to inherit and/or reuse at least some operation context 556 of a prior instruction 504. In some embodiments, the approach of FIG. 5 may optionally be combined with the approach of one or more of FIGS. 2-4. The processor includes a decode unit 508 and one or more execution units 514, which may optionally be similar to, or the same as, those of one or more of FIGS. 1-4. To avoid obscuring the description, the different and/or additional characteristics and features of the embodiment of FIG. 5 will primarily be described.

During operation and/or when in use, the prior instruction 504 may be provided to the decode unit 508. The decode unit may be operative to decode the prior instruction. The prior instruction has a first opcode 528. The first opcode may correspond to any of a wide variety of different types of instructions. Examples include, but are not limited to, scalar arithmetic instructions, packed arithmetic instructions, scalar logical instructions, packed logical instructions, load instructions, store instructions, gather instructions, scatter instructions, and other types of memory access instructions, to name just a few examples.

The prior instruction may explicitly specify or otherwise have the operation context 556. Examples of suitable context includes, but is not limited to, operation type context, operation size context, operand context, memory address context, and combinations thereof. Examples of suitable operation type context includes, but is not limited to, whether the operation is performed on signed or unsigned data, whether the operation is performed with saturation, further clarification about how the operation is to be performed, and the like. Examples of suitable operation size context and/or operand context includes, but is not limited to, the size of an operand (e.g., 32-bits, 64-bits, 128-bits, 256-bits, or 512-bits), the size of a data element (e.g., 8-bits, 16-bits, 3-bits, or 64-bits), and the like.

Examples of suitable memory address context includes, but is not limited to, memory address determination information or parameters, memory address attributes, memory access reordering attributes, and the like. The memory address determination information or parameters may be used to calculate or determine a memory address of one or more operands in memory. In some cases, such parameters or information may tend to remain the same over a sequence of instructions or potentially over a fairly long stretch of code. The specific types of memory address determination information or parameters may vary from one memory addressing mode to another. Some processors support from several to many different addressing modes. Examples of suitable memory address determination information or parameters includes, but is not limited to, "coarser" granularity parameters or information, such as, for example, a scale factor, a register number or identifier of an index register, a register number or identifier of a base register, and a register number or identifier of a segment register. Some instructions may optionally have "alias" information or other information that may be used to allow their memory accesses to be reordered. By way of example, such alias information may be encoded in several bits (e.g., 6-bits) per instruction.

In some embodiments, the decode unit 508 may be operative to store, preserve, or retain an indication 560 of the operation context 556. The previously described ways of storing or preserving such an indication or context are suitable. The decode unit may provide one or more decoded instructions or control signals, corresponding to the prior instruction, to one of the execution units 514 in order to cause or control one of the execution units to perform the prior instruction. The relevant execution unit may perform the prior instruction using and/or based on the operation context 556.

The decode unit 508 may also decode the subsequent instruction 506. The subsequent instruction has a second opcode 532. The second opcode may also correspond to any of a very wide variety of different types of instructions. The examples mentioned above for the prior instruction are suitable. In addition, the prior and subsequent instructions may be either for the same type of operation or a different type of operation. For example, the prior instruction may be an arithmetic instruction, whereas the subsequent instruction may be a logical instruction. As another example, the prior instruction may be a gather instruction, whereas the subsequent instruction may be a scalar store instruction.

In some embodiments, it may be implicit 558 that the subsequent instruction 506 is to inherit and/or reuse the operation context 556 of the prior instruction 504. In some embodiments, the operation context may be reused without any change or modification, and the subsequent instruction may not have any additional bits to re-specify or change the operation context. In other embodiments, the subsequent instruction may have one or more additional bits to re-specify or change the operation context, although typically the number of such bits will be less than the number of bits that would otherwise be needed if the operation context was not reused.

The decode unit 508 may be operative to use the preserved indication 560 when decoding the subsequent instruction. The decode unit may provide one or more decoded instructions or control signals, corresponding to the subsequent instruction, to one of the execution units 514 in order to cause or control the one or more execution units to perform the subsequent instruction. The relevant execution unit may perform the subsequent instruction using and/or based on the operation context 556 (e.g., either without modification or with modification by one or more bits of the subsequent instruction).

Figure 6:
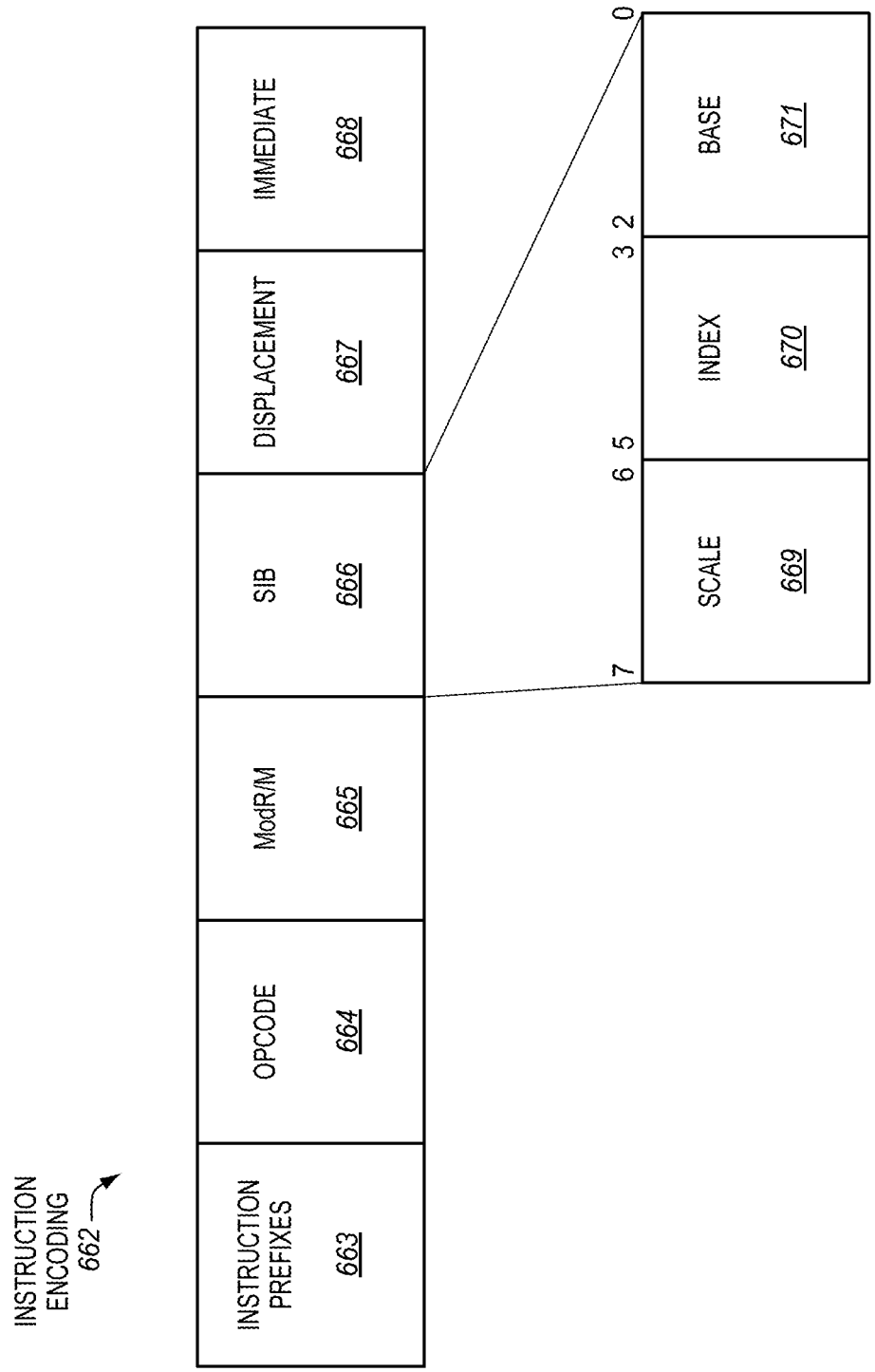
FIG. 6 is a block diagram of an example embodiment of an instruction encoding.

FIG. 6 is a block diagram of an example embodiment of an instruction encoding 662. The instruction encoding is similar to that used in Intel®64 and IA-32 architecture instructions. The encoding has one or more optional instruction prefixes 663 of one byte each, a primary opcode 664 of one, two, or three bytes, an optional one byte ModR/M value 665 (if used for the instruction), an optional one byte scale-index-base (SIB) value 666 (if used for the instruction), an optional address displacement 667 of zero, one, two, or four bytes, and an optional immediate data 668 of zero, one, two, or four bytes.

Certain encodings of the ModR/M byte or value 665 use the SIB byte or value 666 as an additional addressing byte or value. The SIB value and the ModR/M value together may represent an addressing-form specifier. For example, the base-plus-index and scale-plus-index forms of 32-bit addressing use the SIB byte or value. The SIB value includes a scale field 669 to specify a scale factor, an index field 670 to specify the register number of the index register, and a base field 671 to specify the register number of the base register. Some addressing forms include the address displacement 667.

The information or context from one or more of the scale field 669, the index field 670, and the base field 671 represent suitable examples of memory address information or context that may be inherited from a prior instruction and reused by a subsequent instruction, although the scope of the invention is not so limited. By way of example, a load instruction may inherit and reuse a scale factor, index register, and base register of a prior memory access instruction, and may have additional bits to specify a displacement.

In some embodiments, the displacement may optionally be scaled by the data element size of the access. This may help to eliminate some of the bits needed (e.g., by allowing one or more least significant bits, which are generally zeroes anyway, to be omitted. For example, a 3-bit displacement of "011" may represent a displacement of 24 bytes (e.g., 3*8) if the data element size is 64-bits. Without such scaling, the largest positive displacement that can be encoded in 3-bits is three.

Figure 7:
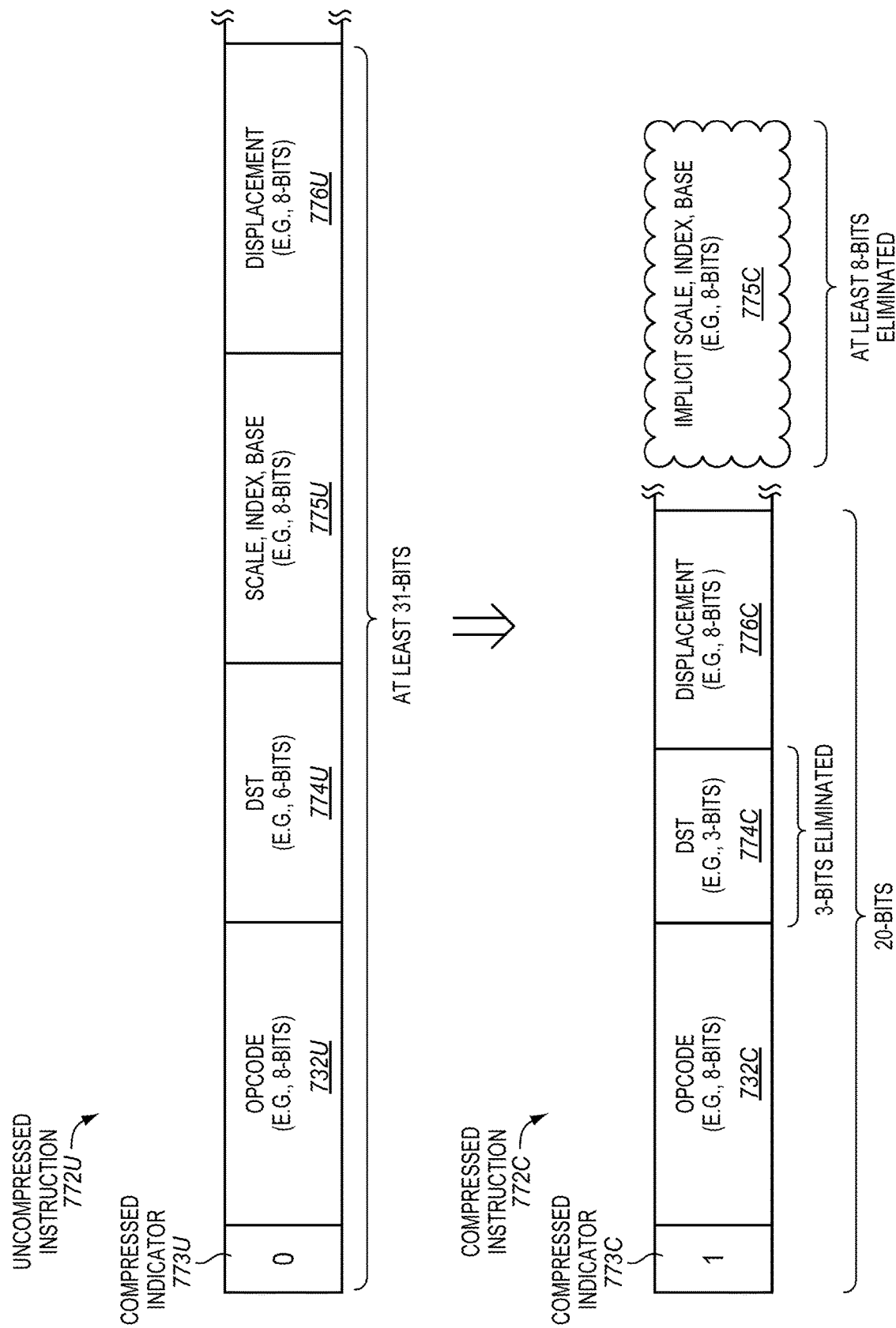
FIG. 7 is a block diagram of a first example embodiment of an uncompressed instruction and a corresponding compressed instruction.

FIG. 7 is a block diagram of a first example embodiment of an uncompressed instruction 772u and a corresponding compressed instruction 772c. These instructions may represent various different types of memory access instructions that have a destination register (e.g., load instructions, gather instructions, load multiple instructions, repeat load instructions, etc.).

The uncompressed instruction has a compressed indicator 773u, an opcode 732u, a destination register specifier (DST) 774u, a scale, index, base (SIB) value 775u, and a displacement 776u. The compressed indicator may indicate whether the instruction is compressed or uncompressed. For example, the compressed indictor may have a first value (e.g., a bit may be cleared to zero) to indicate uncompressed, or a second value (e.g., a bit may be set to one) to indicate compressed. By way of example, for the uncompressed instruction, the compressed indicator may be 1-bit, the opcode may be 8-bits, the destination register specifier (DST) may be 6-bits, the SIB value may be 8-bits, and the displacement may be 8-bits, although this is only one example. For such lengths, the uncompressed instruction may have in total at least 31-bits. In other cases, larger displacements may optionally be used (e.g., two bytes or four bytes).

The compressed instruction has a compressed indicator 773c, an opcode 732c, a destination register specifier (DST) 774c, and a displacement 776c. By way of example, for the compressed instruction, the compressed indicator may be 1-bit (e.g., the same size as that of the uncompressed instruction), the opcode may be 8-bits (e.g., the same size as that of the uncompressed instruction), the destination register specifier (DST) may be 3-bits, and the displacement may be 8-bits (e.g., the same size as that of the uncompressed instruction), although this is only one example. For such lengths, the compressed instruction may have in total at least 20-bits.

Notice that the DST 774c for the compressed instruction is only 3-bits, whereas the DST 774u for the uncompressed instruction is 6-bits. In this example, 3-bits have been eliminated. By way of example, such compression may be achieved by using the approach of one of FIGS. 3-4. Notice also that the SIB value 775c for the compressed instruction is implicit instead of being explicit. In this example, at least 8-bits have been eliminated. By way of example, such compression may be achieved by using the approach of one of FIG. 5. In total, at least eleven bits in this example have been eliminated from the encoding of the compressed instruction.

Figure 8:
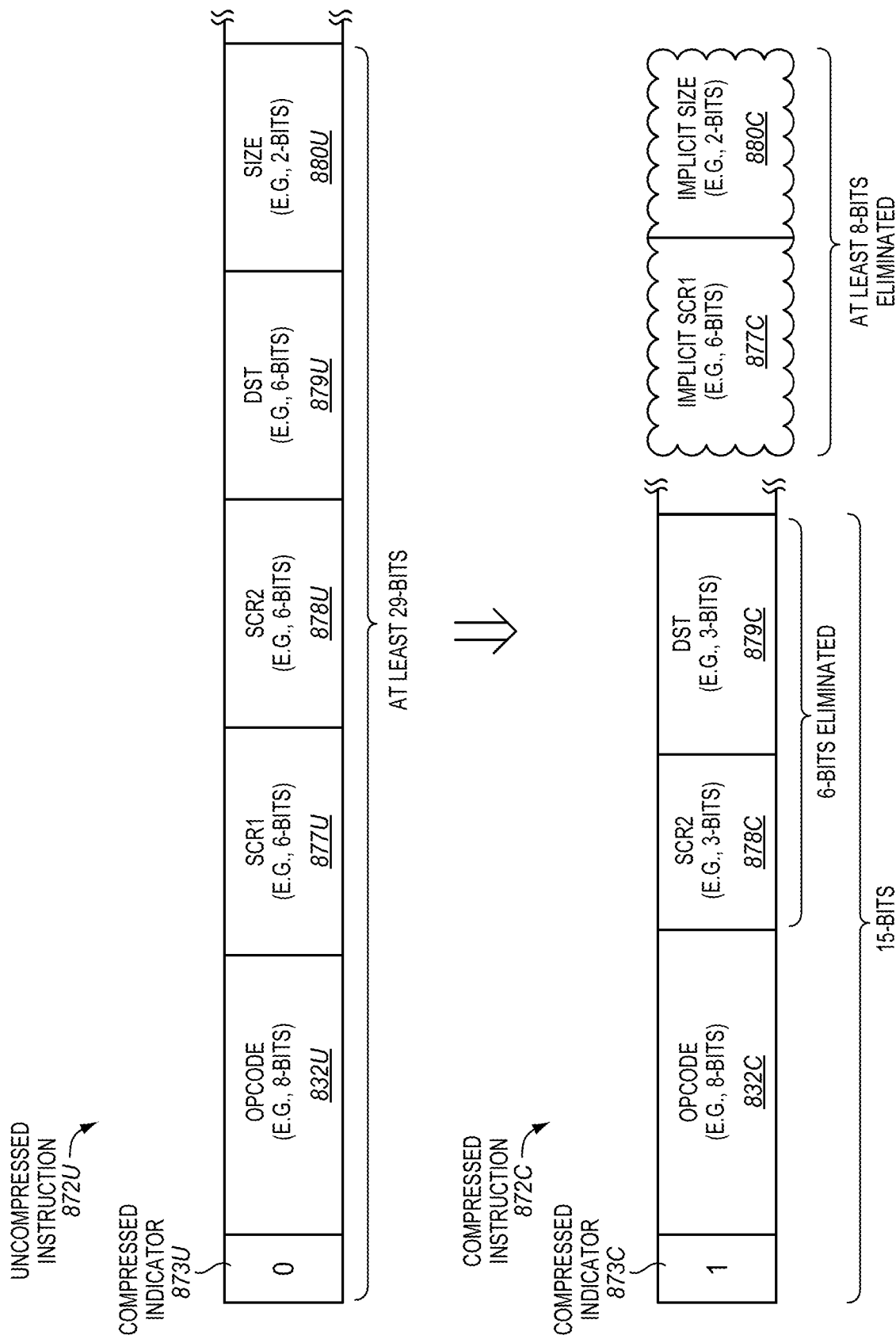
FIG. 8 is a block diagram of a second example embodiment of an uncompressed instruction and a corresponding compressed instruction.

FIG. 8 is a block diagram of a second example embodiment of an uncompressed instruction 872u and a corresponding compressed instruction 872c. By way of example, these instructions may represent various different types of arithmetic and/or logical instructions that use two source registers and a destination.

The uncompressed instruction has a compressed indicator 873u, an opcode 832u, a first source register specifier (SRC1) 877u, a second source register specifier (SRC2) 878u, a destination register specifier (DST) 879u, and a data element size specifier 880u. By way of example, for the uncompressed instruction, the compressed indicator may be 1-bit, the opcode may be 8-bits, the first source register specifier (SRC1) may be 6-bits, the second source register specifier (SRC2) may be 6-bits, the destination register specifier (DST) may be 6-bits, and the data elements size specifier may be 2-bits, although this is only one example. For such lengths, the uncompressed instruction may have in total 29-bits.

The compressed instruction has a compressed indicator 873c, an opcode 832c, a second source register specifier (SRC2) 878c, and a destination register specifier (DST) 879c. By way of example, for the compressed instruction, the compressed indicator may be 1-bit (e.g., the same size as that of the uncompressed instruction), the opcode may be 8-bits (e.g., the same size as that of the uncompressed instruction), the second source register specifier (SRC2) may be 3-bits, and the destination register specifier (DST) may be 3-bits. For such lengths, the uncompressed instruction may have in total 15-bits.

Notice that the first source register specifier (SRC1) 877c for the compressed instruction is implicit instead of being explicit. In this example, 6-bits have been eliminated. By way of example, such compression may be achieved by using the approach of FIG. 2 (e.g., by making the first source register the same as the destination register of a prior instruction). Notice also that the destination register specifier (DST) 879c and SRC2 878c for the compressed instruction are each only 3-bits, whereas the DST 879u and SRC2 878u for the uncompressed instruction are each 6-bits. In this example, 6-bits have been eliminated. By way of example, such compression may be achieved by using the approach of one of FIGS. 3-4. Further, notice that the data elements size specifier 880c for the compressed instruction is implicit instead of being explicit. In this example, 2-bits have been eliminated. By way of example, such compression may be achieved by using the approach of FIG. 5. In total, 14-bits in this example have been eliminated from the encoding of the compressed instruction.

In some embodiments, the approaches used herein may be used in conjunction with dynamic binary translation or other forms of instruction translation, although other embodiments of the invention are not so limited. FIG. 9 is a block diagram of an embodiment of a processor 900 having an instruction translation unit 993 to translate instructions 991 of a source instruction set to instructions 994 of a target instruction set. A set of code 902 may be written in instructions of the source instruction set. By way of example, in some embodiments, the source instruction set may include Intel®64 and/or IA-32 architecture instructions, although the scope of the invention is not so limited.

During operation an instruction fetch unit 992 may fetch the instructions 991 of the source instruction set. One or more decode units 908 may decode these instructions, and for each may output one or more corresponding decoded instructions or control signals to a set of execution units 914. The execution units may perform these instructions of the source instruction set. In some cases, depending upon the particular instructions, the execution units may access registers 916 and/or a memory 922 coupled with the processor.

In some embodiments, the processor may also include an instruction translation unit 993. The instruction translation unit may be operative to translate or convert the instructions 991 of the source instruction set to corresponding instructions 994 of a different target instruction set. In some embodiments, such instruction translation may be performed dynamically or during runtime, as opposed to statically before runtime. Such an instruction translator may be referred to as a dynamic or runtime instruction translator. Various different forms of dynamic or runtime instruction translators are suitable, such as, for example, dynamic or runtime binary translators, instruction emulators, compilers, interpreters, code morphers, and the like. The instruction translation unit may be implemented in hardware, firmware, software, or a combination thereof (e.g., predominantly hardware and/or firmware potentially with some software). In some embodiments, the target instruction set may optionally support a different number of registers (e.g., more registers) than the source instruction set, although this is not required. In some embodiments, the most common instructions may be encoded in two bytes in the target instruction set, although this is not required.

Often, in order to allow them to be reused, the instructions 994 of the target instruction set may optionally be stored as translated code 996 in a translation cache 999. For example translated basic blocks of code may be stored in the translation cache. The translated instructions of the target instruction set may be provided, from the translation cache or otherwise, to the one or more decode units 908. The one or more decode units may decode the instructions of the target instruction set, and for each output one or more corresponding decoded instructions or control signals to the set of execution units 914. The execution units may perform the instructions of the target instruction set.

While it is possible that all instructions 991 of the source instruction set that are to be performed may be translated to corresponding instructions 994 of the target instruction set, the instruction translation often incurs an overhead in terms of additional processing time and/or power consumption. Accordingly, in some cases, such instruction translation may instead be performed opportunistically for only some of the instructions of the source instruction set that are to be performed (e.g., for portions of the code where there is more benefit). This may be the case, for example, for a loop or other portion of code that is performed multiple or many times. Once the translated code has been generated, the saved translated code may be retrieved from the translation cache without needing to be translated again. In such cases, the overhead incurred to perform the instruction translation may be amortized over the multiple times that the translated code is performed.

Typically, the instructions 994 of the target instruction set may offer some advantage over the instructions 991 of the source instruction set. One possible advantage is a compressed, compact, or short instruction encoding as disclosed elsewhere herein. Such a short encoding may help to reduce the code footprint, allow more instructions to be stored in an instruction cache, allow more instructions to be conveyed on a given amount of interconnect bandwidth, or the like. Another possible advantage is a more regular and/or easier to decode instruction encoding. This may help to increase the rate of decoding. Especially when the translated code is to be performed multiple or many times, such benefits may justify the additional overhead of performing the instruction translation. It is contemplated that various implementations may use relatively more or less amounts of instruction translation as desired for the particular implementation. In some cases, only small sections of code that are repeatedly performed many times may be translated (e.g., small loops of arithmetic and/or logical instructions). In some embodiments, the processor may have a hot spot detector 998 to detect a hot spot 990 portion of the code to translate. By way of example, the hot spot detector may include a performance monitor unit and/or a branch prediction unit. In some embodiments, when translation is to be performed, a translation mode of the processor may be configured (e.g., one or more bits in a control register may be configured) to indicate a translation mode.

In some embodiments, there may be both compressed format versions, and uncompressed format versions, of many or most of the instructions 994 of the target instruction set. The compressed format versions may each utilize use one or more of the techniques disclosed herein to help shorten their instruction lengths. In contrast, in the uncompressed format versions, these techniques may not be used, but rather such context may be fully explicitly specified. By way of example, the uncompressed instructions 772u, 872u and compressed instructions 772c, 872c, respectively, of FIGS. 7-8 are suitable examples of such uncompressed and compressed formats. In some embodiments, a bit (e.g., the first bit) of the instruction encoding may indicate whether the instruction has a compressed or uncompressed format, although the scope of the invention is not so limited. When possible, for example when one or more of the techniques disclosed herein may be applied, the instruction translation unit 993 may include compression logic 901 to opportunistically translate the instructions 991 of the source instruction set to compressed format versions of the instructions 994 of the target instruction set and set the bit or other indication (e.g., the compressed indicator 773C, 873C) to indicate that the instruction has the compressed format. The decode unit 995 may include logic 995 to use context of a prior instruction when decoding a subsequent instruction using one or more of the techniques disclosed herein.

Otherwise, for example when none of the techniques disclosed herein may be applied, or when the context changes or needs to be reset for subsequent instructions, the instruction translation unit 993 and/or the compression logic 901 may fall back to translating the instructions 991 of the source instruction set to uncompressed format versions of the instructions 994 of the target instruction set. The bit or other indication (e.g., the compressed indicator 773U, 873U) may be cleared or otherwise configured indicate that the instruction has the uncompressed format. Often, a compressed format instruction may be used as long as at least some of its context can be set up from a prior instruction. For example, a compressed load instruction with an implicit base register may be used as long as there is a prior instruction using the same base register in the same basic block of translated code. In addition, each compressed instruction should generally have a unique predecessor in the dynamic control flow. For example, a compressed instruction generally should not be the target of a jump, call, return, or other control flow transfer instruction, since if the compressed instruction can be reached via multiple different paths, it may be unclear what context to use for the compressed instruction. In such cases, the full uncompressed version of the instruction may be used instead.

Other embodiments are not limited to such instruction translation. In other embodiments, at least one or optionally several or many instructions added to an existing instruction set, or at least one or optionally several or many instructions in a newly created instruction set, may utilize one or more of the approaches disclosed herein, whether or not they are the target of instruction translation from another instruction set.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a co-processor including one or more special purpose cores intended primarily for graphics and/or scientific (throughput). Such different processors lead to different computer system architectures, which may include: 1) the co-processor on a separate chip from the CPU; 2) the co-processor on a separate die in the same package as a CPU; 3) the co-processor on the same die as a CPU (in which case, such a co-processor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described co-processor, and additional functionality. Exemplary core architectures are described next, followed by descriptions of exemplary processors and computer architectures.

Exemplary Core Architectures

In-Order and Out-of-Order Core Block Diagram

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, co-processor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multi-threading, simultaneous multi-threading (where a single physical core provides a logical core for each of the threads that physical core is simultaneously multi-threading), or a combination thereof (e.g., time sliced fetching and decoding and simultaneous multi-threading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 11112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Processor with Integrated Memory Controller and Graphics

Figure 12:
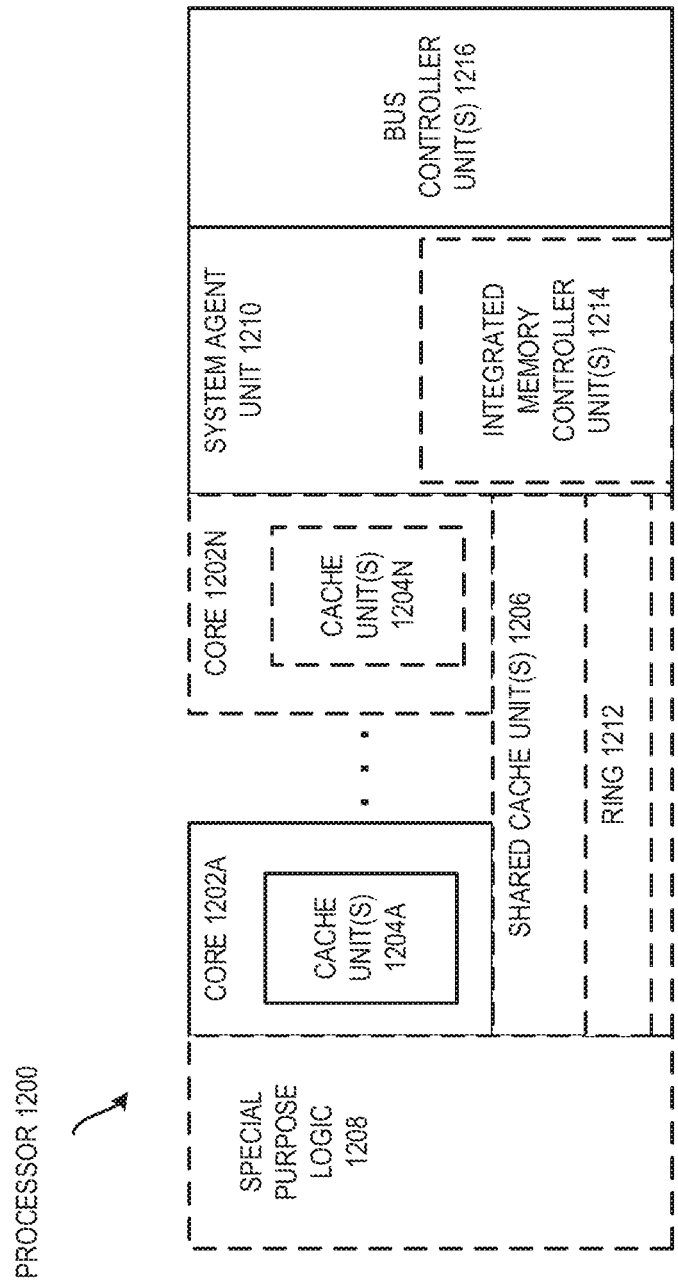
FIG. 12 is a block diagram of an embodiment of a processor that may have more than one core, may have an integrated memory controller, and may have integrated graphics.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a co-processor with the cores 1202A-N being a large number of special purpose cores intended primarily for graphics and/or scientific (throughput); and 3) a co-processor with the cores 1202A-N being a large number of general purpose in-order cores. Thus, the processor 1200 may be a general-purpose processor, co-processor or special-purpose processor, such as, for example, a network or communication processor, compression engine, graphics processor, GPGPU (general purpose graphics processing unit), a high-throughput many integrated core (MIC) co-processor (including 30 or more cores), embedded processor, or the like. The processor 1200 may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multi-threading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
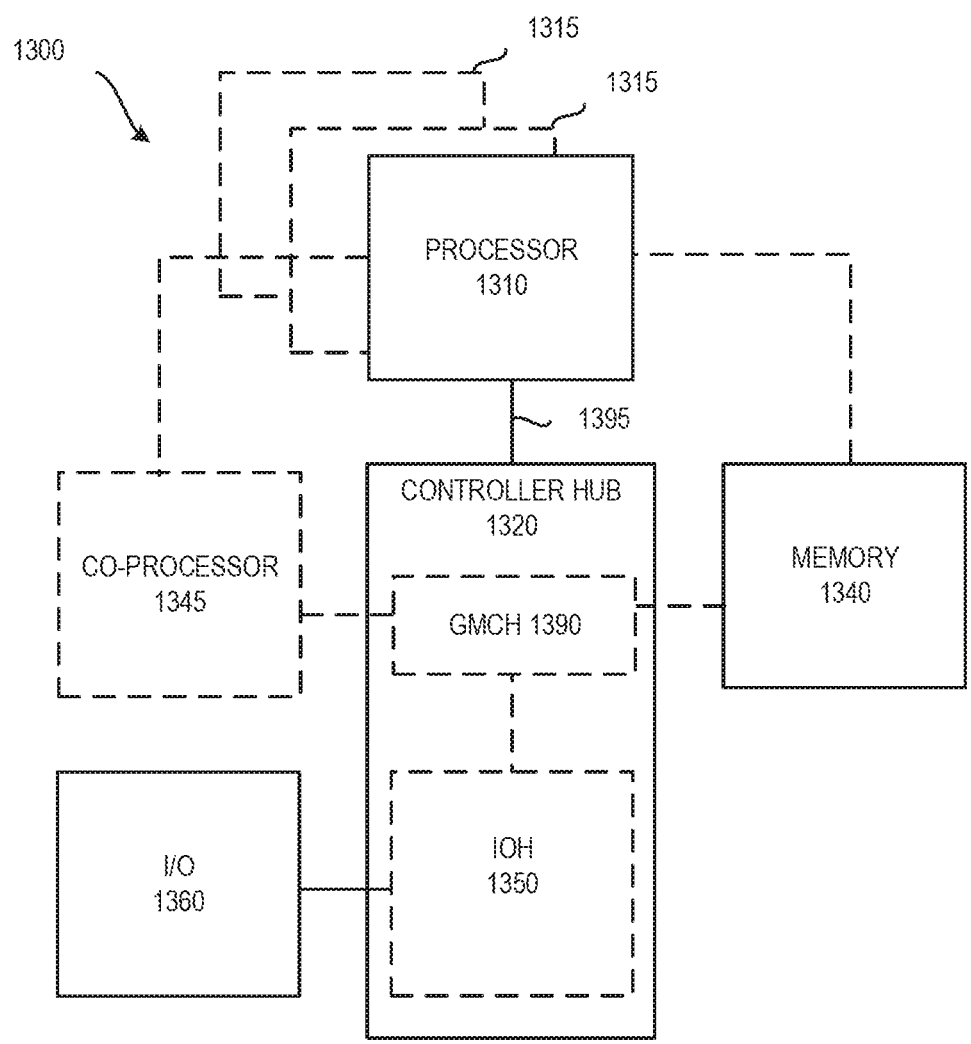
FIG. 13 is a block diagram of a first embodiment of a computer architecture.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a co-processor 1345; the IOH 1350 is couples input/output (I/O) devices 1360 to the GMCH 1390. Alternatively, one or both of the memory and graphics controllers are integrated within the processor (as described herein), the memory 1340 and the co-processor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the co-processor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be co-processor instructions. The processor 1310 recognizes these co-processor instructions as being of a type that should be executed by the attached co-processor 1345. Accordingly, the processor 1310 issues these co-processor instructions (or control signals representing co-processor instructions) on a co-processor bus or other interconnect, to co-processor 1345. Co-processor(s) 1345 accept and execute the received co-processor instructions.

Figure 14:
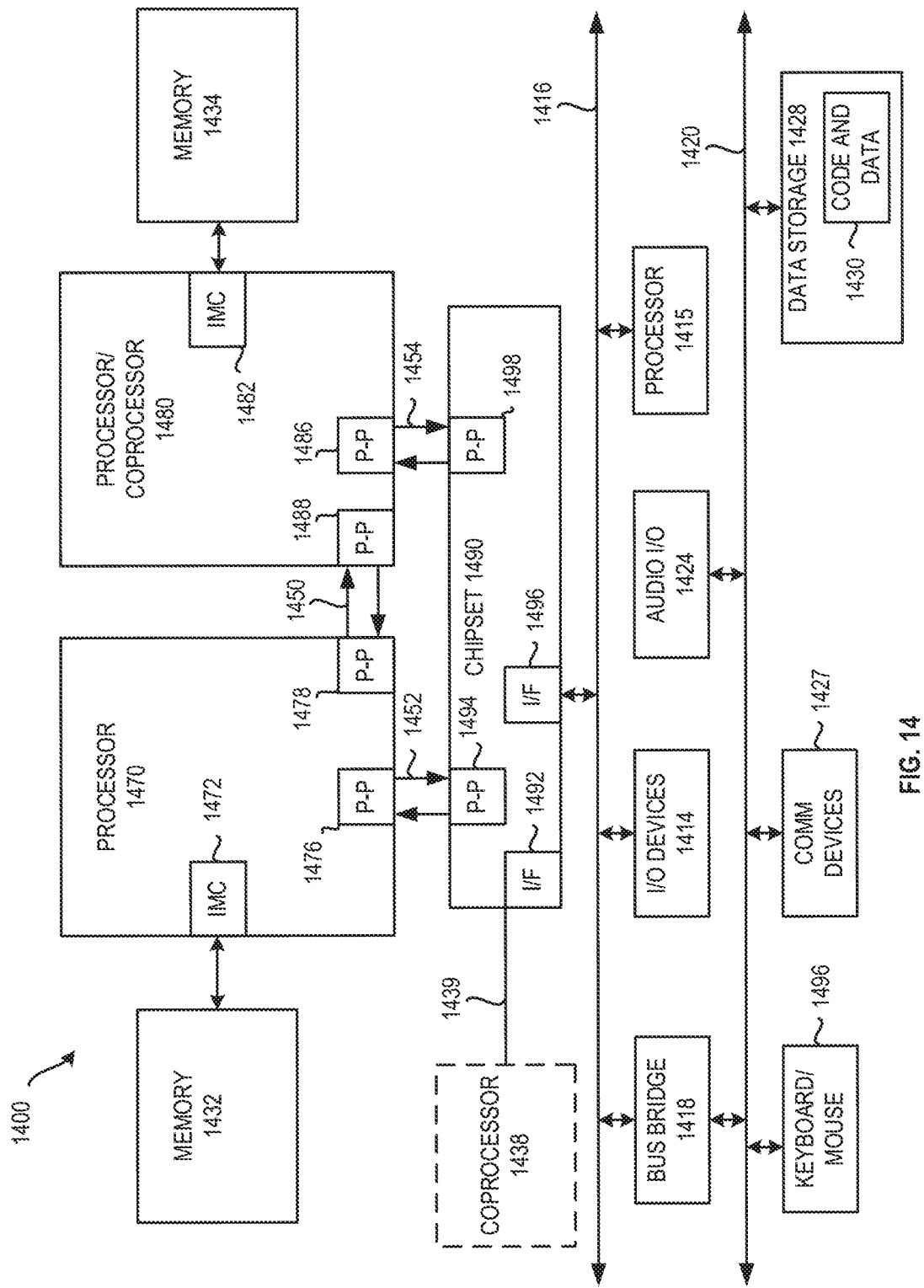
FIG. 14 is a block diagram of a second embodiment of a computer architecture.

Referring now to FIG. 14, shown is a block diagram of a first more specific exemplary system 1400 in accordance with an embodiment of the present invention. As shown in FIG. 14, multi-processor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while co-processor 1438 is co-processor 1345. In another embodiment, processors 1470 and 1480 are respectively processor 1310 co-processor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the co-processor 1438 via a high-performance interface 1439. In one embodiment, the co-processor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as co-processors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
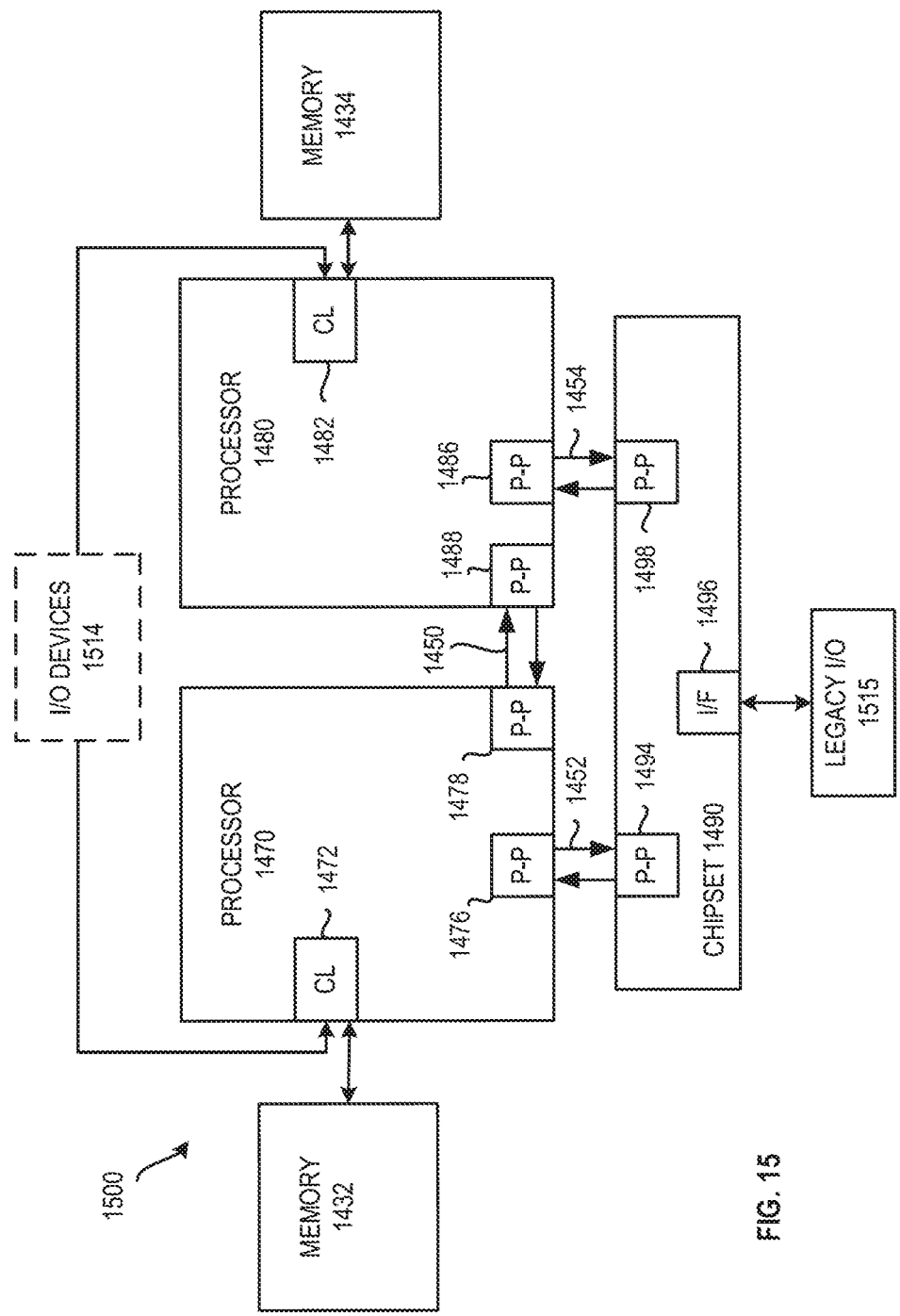
FIG. 15 is a block diagram of a third embodiment of a computer architecture.

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
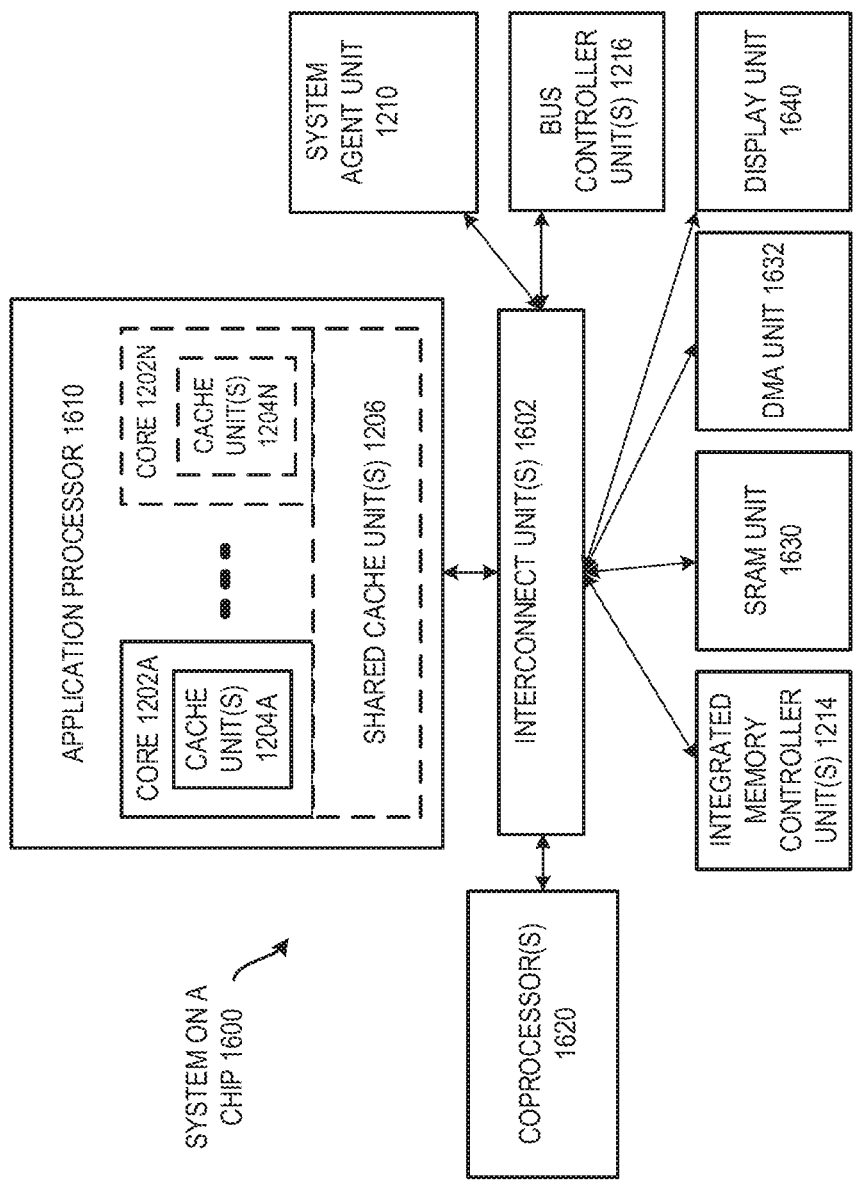
FIG. 16 is a block diagram of a fourth embodiment of a computer architecture.

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 152A-N and shared cache unit(s) 1206; a system agent unit 1210; a bus controller unit(s) 1216; an integrated memory controller unit(s) 1214; a set or one or more co-processors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the co-processor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

Components, features, and details described for any of the processors disclosed herein may optionally apply to any of the methods disclosed herein, which in embodiments may optionally be performed by and/or with such processors. Any of the processors described herein in embodiments may optionally be included in any of the systems disclosed herein (e.g., any of the systems of FIGS. 13-16). Any of the processors disclosed herein may optionally, in some embodiments, having any of the microarchitectural components shown in other processors disclosed herein (e.g., any of those shown in FIGS. 10B, 11A, 11B, 12).

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a tangible and/or non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid-state matter or material, such as, for example, a semiconductor material, a phase change material, a magnetic solid material, a solid data storage material, etc. Alternatively, a non-tangible transitory computer-readable transmission media, such as, for example, an electrical, optical, acoustical or other form of propagated signals—such as carrier waves, infrared signals, and digital signals, may optionally be used.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches). Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

Example Embodiments

The following examples pertain to further embodiments. Specifics in the examples may be used anywhere in one or more embodiments.

Example 1 is a processor including a decode unit to decode a prior instruction that is to have at least a first context. The decode unit is also to decode a subsequent instruction, which is to be after the prior instruction in original program order. The decode unit to use the first context of the prior instruction to determine a second context for the subsequent instruction. The processor also includes an execution unit coupled with the decode unit. The execution unit is to perform the subsequent instruction based at least in part on the second context.

Example 2 includes the processor of Example 1, in which the first context is to comprise a register of the prior instruction. Also, optionally in which the decode unit is implicitly to reuse the register of the prior instruction for the subsequent instruction.

Example 3 includes the processor of Example 2, in which the first context is to comprise a destination register of the prior instruction, which is optionally to be specified by the prior instruction. Also, optionally in which the decode unit is implicitly to reuse the destination register of the prior instruction as a source register for the subsequent instruction.

Example 4 includes the processor of any one of Examples 2 to 3, in which the register is able to be any one of a plurality of registers for the prior and subsequent instructions. Also, optionally in which the prior and subsequent instructions are each able to be any one of a plurality of different types of instructions.

Example 5 includes the processor of Example 1, in which the first context is to comprise a register of the prior instruction. Also, optionally in which the subsequent instruction is to specify a value, and further optionally in which the decode unit is to use the value to determine a second, different register for the subsequent instruction based at least in part on the register of the prior instruction.

Example 6 includes the processor of Example 5, in which the decode unit is implicitly to apply the value relative to the register of the prior instruction to determine the second, different register for the subsequent instruction.

Example 7 includes the processor of Example 5, in which the decode unit is implicitly to apply the value relative to a register subset, of a plurality of different register subsets, which is to include the register of the prior instruction, to determine the second, different register for the subsequent instruction.

Example 8 includes the processor of Example 7, in which the decode unit is implicitly to apply the value relative to one of a first register of the register subset, a last register of the register subset, and a center register of the register subset.

Example 9 includes the processor of Example 1, in which the first context is to comprise operation context. Also, optionally in which the decode unit is implicitly to reuse the operation context of the prior instruction for the subsequent instruction.

Example 10 includes the processor of Example 9, in which the operation context is to comprise memory address context. Also, optionally in which the decode unit is implicitly to reuse the memory address context of the prior instruction for the subsequent instruction.

Example 11 includes the processor of Example 10, in which the memory address context is to comprise memory address determination information that is at least one of a scale factor, a register identifier of an index register, a register identifier of a base register, and a register identifier of a segment register.

Example 12 includes the processor of any one of Examples 10 to 11, in which the memory address context is to comprise information to allow a memory access associated with the subsequent instruction to be reordered.

Example 13 includes the processor of Example 9, in which the operation context is to comprise a size of a data element.

Example 14 includes the processor of Example 1, in which the second context is to be derived from the first context based on one or more bits that are to be specified in an encoding of the subsequent instruction.

Example 15 includes the processor of any one of Examples 1 to 15, in which the decode unit is to preserve the first context when decoding the prior instruction. Also, optionally in which the decode unit is to use the preserved first context when decoding the subsequent instruction.

Example 16 includes the processor of any one of Examples 1 to 15, further including an instruction translation unit. Also, optionally in which the instruction translation unit is to translate an instruction of a source instruction set to the subsequent instruction, which is to be an instruction of a different, target instruction set.

Example 17 is a method performed by a processor that includes decoding a prior instruction having at least a first context. Also, decoding a subsequent instruction, which is after the prior instruction in original program order, including using the first context of the prior instruction to determine a second context for the subsequent instruction.

Example 18 includes the method of Example 17, in which decoding the prior instruction includes decoding the prior instruction having a register for the first context. Also, optionally in which decoding the subsequent instruction includes implicitly reusing the register of the prior instruction for the subsequent instruction. Further, optionally in which the register is able to be any one of a plurality of registers for the prior and subsequent instructions.

Example 19 includes the method of Example 17, in which decoding the prior instruction includes decoding the prior instruction having a register for the first context. Also, optionally in which decoding the subsequent instruction includes decoding the subsequent instruction that specifies a value. The method further optionally including using the value to determine a second, different register for the subsequent instruction based at least in part on the register of the prior instruction.

Example 20 includes the method of Example 17, in which decoding the prior instruction includes decoding the prior instruction having memory address determination information for the first context. Also, optionally in which the memory address determination information is at least one of a scale factor, a register identifier of an index register, a register identifier of a base register, and a register identifier of a segment register. Further, optionally in which decoding the subsequent instruction includes implicitly reusing the memory address context of the prior instruction for the subsequent instruction.

Example 21 includes the method of any one of Examples 17 to 20, further including translating an instruction of a source instruction set to the subsequent instruction, which is of a different, target instruction set.

Example 22 is a computer system including a bus or other interconnect, a dynamic random access memory (DRAM) coupled with the interconnect, and a processor coupled with the interconnect. The processor including a decode unit to decode, a prior instruction that is to have at least a first context. The decode unit to also decode a subsequent instruction, which is to be after the prior instruction in original program order. The decode unit to use the first context of the prior instruction to determine a second context for the subsequent instruction. The processor further includes an execution unit coupled with the decode unit. The execution unit is to perform the subsequent instruction based at least in part on the second context.

Example 23 is the computer system of Example 22, in which the first context is to be reused as the second context.

Example 24 is an article of manufacture including an optionally non-transitory machine-readable storage medium. The machine-readable storage medium storing a prior instruction and a subsequent instruction. The prior and subsequent instructions, if performed by a machine, are to cause the machine to perform operations including decode the prior instruction that is to comprise at least a first context, and decode the subsequent instruction, which is to be after the prior instruction in original program order, including to use the first context of the prior instruction to determine a second context for the subsequent instruction.

Example 25 includes the article of manufacture of Example 24, in which the first context is to be reused as the second context.

Example 26 is a processor that includes means for decoding a prior instruction having at least a first context. The processor also includes means for decoding a subsequent instruction, which is after the prior instruction in original program order, and using the first context of the prior instruction to determine a second context for the subsequent instruction.

Example 27 includes the processor of any one of Examples 1 to 16, further including an optional branch prediction unit to predict branches, and an optional instruction prefetch unit, coupled with the branch prediction unit, the instruction prefetch unit to prefetch instructions including the prior and subsequent instructions. The processor may also optionally include an optional level 1 (L1) instruction cache coupled with the instruction prefetch unit, the L1 instruction cache to store instructions including the prior and subsequent instructions, an optional L1 data cache to store data, and an optional level 2 (L2) cache to store data and instructions. The processor may also optionally include an instruction fetch unit coupled with the decode unit, the L1 instruction cache, and the L2 cache, to fetch the prior and subsequent instructions, in some cases from one of the L1 instruction cache and the L2 cache, and to provide the prior and subsequent instructions to the decode unit. The processor may also optionally include a register rename unit to rename registers, an optional scheduler to schedule one or more operations that have been decoded from the prior and subsequent instructions for execution, and an optional commit unit to commit execution results of the prior and subsequent instructions.

Example 28 includes a system-on-chip that includes at least one interconnect, the processor of any one of Examples 1 to 16 coupled with the at least one interconnect, an optional graphics processing unit (GPU) coupled with the at least one interconnect, an optional digital signal processor (DSP) coupled with the at least one interconnect, an optional display controller coupled with the at least one interconnect, an optional memory controller coupled with the at least one interconnect, an optional wireless modem coupled with the at least one interconnect, an optional image signal processor coupled with the at least one interconnect, an optional Universal Serial Bus (USB) 3.0 compatible controller coupled with the at least one interconnect, an optional Bluetooth 4.1 compatible controller coupled with the at least one interconnect, and an optional wireless transceiver controller coupled with the at least one interconnect.

Example 29 is a processor or other apparatus operative to perform the method of any one of Examples 17 to 21.

Example 30 is a processor or other apparatus that includes means for performing the method of any one of Examples 17 to 21.

Example 31 is an optionally non-transitory and/or tangible machine-readable medium, which optionally stores or otherwise provides instructions including the prior and subsequent instructions that if and/or when executed by a processor, computer system, electronic device, or other machine, are operative to cause the machine to perform the method of any one of Examples 17 to 21.

Example 32 is a processor or other apparatus substantially as described herein.

Example 33 is a processor or other apparatus that is operative to perform any method substantially as described herein.

What is claimed is:

1. A processor comprising:
   a decode unit to decode:
      a prior instruction that is to have at least a first context, wherein the prior instruction is an arithmetic instruction; and
      a subsequent instruction, which is to be after the prior instruction in original program order, the subsequent instruction having an opcode, a field that is allowed by the opcode to have either one of at least a first value and a second value, the decode unit, when the field has the first value, to use the first context of the prior instruction to determine a second context for the subsequent instruction, the decode unit, when the field has the second value, not to use the first context of the prior instruction to determine the second context for the subsequent instruction, wherein a length in bits of an encoding of the subsequent instruction is shorter when the field has the first value than when the field has the second value; and an execution unit coupled with the decode unit, the execution unit to perform the subsequent instruction.

2. The processor of claim 1, wherein the first context is to comprise a register of the prior instruction, and wherein the decode unit is implicitly to reuse the register of the prior instruction for the subsequent instruction.

3. The processor of claim 2, wherein the first context is to comprise a destination register of the prior instruction, which is to be specified by the prior instruction, and wherein the decode unit is implicitly to reuse the destination register of the prior instruction as a source register for the subsequent instruction.

4. The processor of claim 2, wherein the register is able to be any one of a plurality of registers for the prior and subsequent instructions, and wherein the prior and subsequent instructions are each able to be any one of a plurality of different types of instructions.

5. The processor of claim 1, wherein the first context is to comprise a register of the prior instruction, wherein the subsequent instruction is to specify a value, and wherein the decode unit is to use the value to determine a second, different register for the subsequent instruction based at least in part on the register of the prior instruction, and wherein the subsequent instruction, when the field has the first value, is to have the shorter length due to at least one of an omitted field of the subsequent instruction and a shortened field of the subsequent instruction due to the use of the first context.

6. The processor of claim 5, wherein the decode unit is implicitly to apply the value relative to the register of the prior instruction to determine the second, different register for the subsequent instruction.

7. The processor of claim 5, wherein the decode unit is implicitly to apply the value relative to a register subset, of a plurality of different register subsets, which is to include the register of the prior instruction, to determine the second, different register for the subsequent instruction.

8. The processor of claim 7, wherein the decode unit is implicitly to apply the value relative to one of a first register of the register subset, a last register of the register subset, and a center register of the register subset.

9. The processor of claim 1, wherein the first context is to comprise operation context, and wherein the decode unit, when the field has the first value, is implicitly to reuse the operation context of the prior instruction for the subsequent instruction.

10. The processor of claim 9, wherein the operation context is to comprise memory address context, wherein the decode unit, when the field has the first value, is implicitly to reuse the memory address context of the prior instruction for the subsequent instruction, and wherein the subsequent instruction, when the field has the first value, is to have the shorter length due to the reuse of the memory address context.

11. The processor of claim 10, wherein the memory address context is to comprise memory address determination information that is at least one of a scale factor, a register identifier of an index register, a register identifier of a base register, and a register identifier of a segment register.

12. The processor of claim 10, wherein the memory address context is to comprise information to allow a memory access associated with the subsequent instruction to be reordered.

13. The processor of claim 9, wherein the operation context is to comprise a size of a data element.

14. The processor of claim 1, wherein the second context, when the field has the first value, is to be derived from the first context based on one or more bits that are to be specified in an encoding of the subsequent instruction.

15. The processor of claim 1, wherein the decode unit, when the field has the first value, is to preserve the first context when decoding the prior instruction, and use the preserved first context when decoding the subsequent instruction.

16. The processor of claim 1, further comprising an instruction translation unit, the instruction translation unit to translate an instruction of a source instruction set to the subsequent instruction, which is to be an instruction of a different, target instruction set.

17. A method performed by a processor comprising:
decoding a first prior instruction having at least a first context, wherein the first prior instruction is an arithmetic instruction;
decoding a first subsequent instruction, which is after the first prior instruction in original program order, the first subsequent instruction having an opcode and a first field having a first value, wherein the first field is allowed by the opcode to have either the first value or a second value that is different than the first value;
using the first context of the first prior instruction to determine a second context for the first subsequent instruction based on the first field having the first value;
decoding a second prior instruction having at least a first context, wherein the second prior instruction is another instance of the arithmetic instruction;
decoding a second subsequent instruction, which is after the second prior instruction in the original program order, the second subsequent instruction having a first field having the second value, the second subsequent instruction having an opcode that is identical to the opcode of the first subsequent instruction, but the second subsequent instruction having a shorter length in bits than the first subsequent instruction;
not using the first context of the second prior instruction to determine a second context for the second subsequent instruction based on the first field of the second subsequent instruction having the second value; and
executing the first prior instruction, including performing an arithmetic operation on source data indicated by the first prior instruction to produce a result, and storing the result of the first prior instruction in a destination register.

18. The method of claim 17, wherein decoding the first prior instruction comprises decoding the first prior instruction having a register for the first context of the first prior instruction, wherein decoding the first subsequent instruction comprises implicitly reusing the register of the first prior instruction for the first subsequent instruction, and wherein the register is able to be any one of a plurality of registers for the first prior and first subsequent instructions.

19. The method of claim 17, wherein decoding the first prior instruction comprises decoding the first prior instruction having a register for the first context, wherein decoding the first subsequent instruction comprises decoding the first subsequent instruction that specifies a given value, and using the given value to determine a second, different register for the first subsequent instruction based at least in part on the register of the first prior instruction.

20. The method of claim 17, wherein decoding the first prior instruction comprises decoding the first prior instruction having memory address determination information for the first context of the first prior instruction, the memory address determination information being at least one of a scale factor, a register identifier of an index register, a register identifier of a base register, and a register identifier of a segment register, and wherein decoding the first subsequent instruction comprises implicitly reusing the memory address context of the first prior instruction for the first subsequent instruction.

21. The method of claim 17, further comprising translating an instruction of a source instruction set to the first subsequent instruction, which is of a different, target instruction set.

22. A computer system comprising:
an interconnect;
a dynamic random access memory (DRAM) coupled with the interconnect; and
a processor coupled with the interconnect, the processor including:
  a decode unit to decode:
    a prior instruction that is to have at least a first context, wherein the prior instruction is an arithmetic instruction; and
    a subsequent instruction, which is to be after the prior instruction in original program order, the subsequent instruction having an opcode and a field that is allowed by the opcode to have either one of at least a first value and a second value, the decode unit, when the field has the first value, to use the first context of the prior instruction to determine a second context for the subsequent instruction, the decode unit, when the field has the second value, not to use the first context of the prior instruction to determine the second context for the subsequent instruction, wherein a length in bits of an encoding of the subsequent instruction is shorter when the field has the first value than when the field has the second value; and
  at least one execution unit coupled with the decode unit, the at least one execution unit to perform the prior instruction and the subsequent instruction, wherein to perform the prior instruction includes to perform an arithmetic operation on source data indicated by the prior instruction and to store a result of the arithmetic operation in a destination register.

23. The computer system of claim 22, wherein the first context is to be reused as the second context.

24. An article of manufacture comprising a non-transitory machine-readable storage medium, the non-transitory machine-readable storage medium storing a first prior instruction, a first subsequent instruction, a second prior instruction, and a second subsequent instruction, the first and second prior and the first and second subsequent instructions, if performed by a machine, cause the machine to perform operations comprising to:
  decode the first prior instruction which is to have at least a first context, wherein the first prior instruction is an arithmetic instruction;
  decode the first subsequent instruction, which is to be after the first prior instruction in original program order, the first subsequent instruction having an opcode and a first field that is to have a first value, wherein the first field is allowed by the opcode to have either the first value or a second value that is different than the first value;
  use the first context of the first prior instruction to determine a second context for the first subsequent instruction when the first field has the first value;
  decode the second prior instruction which is to have at least a first context;
  decode the second subsequent instruction, which is to be after the second prior instruction in the original program order, the second subsequent instruction having a first field which is to have the second value, the second subsequent instruction having an opcode that is identical to the opcode of the first subsequent instruction, but the second subsequent instruction having a shorter length in bits than the first subsequent instruction; and
  not use the first context of the second prior instruction to determine a second context for the second subsequent instruction when the first field of the second subsequent instruction has the second value; and
  execute the first prior instruction, including to perform an arithmetic operation on source data of the first prior instruction to produce a result, and to store the result of the first prior instruction in a destination register of the first prior instruction.

25. The article of manufacture of claim 24, wherein the first context of the first prior instruction is to be reused as the second context for the first subsequent instruction, and wherein the first subsequent instruction is to have the shorter length due to at least one of an omitted field of the first subsequent instruction and a shortened field of the first subsequent instruction due to the use of the first context.

* * * * *